(12) United States Patent
Pham et al.

(10) Patent No.: US 8,354,189 B2
(45) Date of Patent: Jan. 15, 2013

(54) ELECTRODES INCLUDING NOVEL BINDERS AND METHODS OF MAKING AND USING THE SAME

(75) Inventors: Phat T. Pham, Little Canada, MN (US); Dinh B. Le, St. Paul, MN (US); Mark N. Obrovac, Halifax (CA); Leif Christensen, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 382 days.

(21) Appl. No.: 12/525,680

(22) PCT Filed: Jan. 24, 2008

(86) PCT No.: PCT/US2008/051888
§ 371 (c)(1), (2), (4) Date: Aug. 4, 2009

(87) PCT Pub. No.: WO2008/097723
PCT Pub. Date: Aug. 14, 2008

(65) Prior Publication Data
US 2010/0075226 A1 Mar. 25, 2010

Related U.S. Application Data

(63) Continuation-in-part of application No. 11/671,601, filed on Feb. 6, 2007, now Pat. No. 7,875,388.

(60) Provisional application No. 60/911,877, filed on Apr. 14, 2007, provisional application No. 60/911,878, filed on Apr. 14, 2007, provisional application No. 60/911,879, filed on Apr. 14, 2007.

(51) Int. Cl.
*H01M 4/34* (2006.01)
(52) U.S. Cl. ............... 429/209; 429/232; 429/231.95
(58) Field of Classification Search .............. 429/209, 429/231.95
See application file for complete search history.

(56) References Cited

U.S. PATENT DOCUMENTS

| | | | |
|---|---|---|---|
| 4,358,545 A | 11/1982 | Ezzell et al. | |
| 4,417,969 A | 11/1983 | Ezzell et al. | |
| 5,508,135 A | 4/1996 | Lelental et al. | |
| 5,536,599 A | 7/1996 | Alamgir et al. | |
| 5,709,968 A | 1/1998 | Shimizu | |
| 5,763,119 A | 6/1998 | Adachi | |
| 5,858,573 A | 1/1999 | Abraham et al. | |
| 5,882,812 A | 3/1999 | Visco et al. | |
| 6,004,698 A | 12/1999 | Richardson et al. | |
| 6,045,952 A | 4/2000 | Kerr et al. | |
| 6,120,565 A | 9/2000 | Dix et al. | |
| 6,203,944 B1 | 3/2001 | Turner et al. | |
| 6,255,017 B1 | 7/2001 | Turner | |
| 6,287,722 B1 | 9/2001 | Barton et al. | |

(Continued)

FOREIGN PATENT DOCUMENTS
EP   0 850 932 A1   7/1998

(Continued)

*Primary Examiner* — Jane Rhee
(74) *Attorney, Agent, or Firm* — Adam Bramwell

(57) ABSTRACT

Provided are electrode compositions for lithium-ion electrochemical cells that include novel binders. The novel binders include lithium polysalts of carboxylic and sulfonic acids, lithium salts of copolymers of acids, lithium polysulfonate fluoropolymers, a cured phenolic resin, cured glucose, and combinations thereof.

13 Claims, 4 Drawing Sheets

U.S. PATENT DOCUMENTS

| | | | |
|---|---|---|---|
| 6,387,570 B1 | 5/2002 | Nakamura et al. | |
| 6,387,571 B1 | 5/2002 | Lain et al. | |
| 6,436,578 B2 | 8/2002 | Turner et al. | |
| 6,586,138 B2 | 7/2003 | Pekala et al. | |
| 6,624,328 B1 | 9/2003 | Guerra | |
| 6,680,145 B2 | 1/2004 | Obrovac et al. | |
| 6,699,336 B2 | 3/2004 | Turner et al. | |
| 6,780,544 B2 | 8/2004 | Noh | |
| 6,790,555 B2 | 9/2004 | Kolb et al. | |
| 6,835,226 B2 | 12/2004 | Nishino et al. | |
| 6,964,828 B2 | 11/2005 | Lu et al. | |
| 6,997,228 B2 | 2/2006 | Hong | |
| 7,078,128 B2 | 7/2006 | Lu et al. | |
| 7,087,348 B2 | 8/2006 | Holman et al. | |
| 7,150,770 B2 | 12/2006 | Keipert et al. | |
| 7,150,771 B2 | 12/2006 | Keipert et al. | |
| 7,297,444 B2 | 11/2007 | Sano | |
| 7,341,804 B2 | 3/2008 | Christensen | |
| 7,348,088 B2 | 3/2008 | Hamrock et al. | |
| 7,498,100 B2 | 3/2009 | Christensen et al. | |
| 8,034,485 B2 | 10/2011 | Dahn et al. | |
| 2002/0136952 A1* | 9/2002 | Travas-Sejdic et al. | 429/217 |
| 2003/0211390 A1 | 11/2003 | Dahn et al. | |
| 2004/0116742 A1 | 6/2004 | Guerra | |
| 2005/0079417 A1 | 4/2005 | Kim et al. | |
| 2005/0164090 A1 | 7/2005 | Kim et al. | |
| 2005/0208378 A1 | 9/2005 | Mizutani et al. | |
| 2005/0221168 A1 | 10/2005 | Dahn et al. | |
| 2005/0221196 A1 | 10/2005 | Dahn et al. | |
| 2005/0250008 A1 | 11/2005 | Mizutani et al. | |
| 2006/0019169 A1 | 1/2006 | Smith et al. | |
| 2006/0046144 A1 | 3/2006 | Obrovac | |
| 2006/0068292 A1 | 3/2006 | Mizutani et al. | |
| 2006/0088769 A1 | 4/2006 | Arora et al. | |
| 2006/0121348 A1 | 6/2006 | Mizutani et al. | |
| 2006/0204850 A1* | 9/2006 | Ham et al. | 429/231.3 |
| 2006/0263696 A1 | 11/2006 | Kim et al. | |
| 2006/0263697 A1 | 11/2006 | Dahn et al. | |
| 2007/0020521 A1 | 1/2007 | Obrovac et al. | |
| 2007/0020522 A1 | 1/2007 | Obrovac et al. | |
| 2007/0020528 A1 | 1/2007 | Obrovac et al. | |
| 2007/0092796 A1 | 4/2007 | Matsuda et al. | |
| 2007/0128517 A1 | 6/2007 | Christensen et al. | |
| 2007/0166615 A1 | 7/2007 | Takamuku et al. | |
| 2007/0269718 A1 | 11/2007 | Krause et al. | |
| 2008/0032192 A1 | 2/2008 | Yokomizo et al. | |

FOREIGN PATENT DOCUMENTS

| | | |
|---|---|---|
| EP | 1 361 194 A1 | 11/2003 |
| JP | 2000-212322 | 8/2000 |
| JP | 2001-143757 | 5/2001 |
| JP | 2003-012850 | 1/2003 |
| JP | 2003-208840 | 10/2003 |
| JP | 2003-282147 | 10/2003 |
| JP | 2003282147 A * | 10/2003 |
| JP | 2004-087335 | 3/2004 |
| WO | WO 2006/109948 A1 | 10/2006 |
| WO | WO 2007/044315 A1 | 4/2007 |

* cited by examiner

ELECTRODES INCLUDING NOVEL BINDERS AND METHODS OF MAKING AND USING THE SAME

RELATED APPLICATIONS

This application is a national stage filing under 35 U.S.C. 371 of PCT/US2008/051888, filed Jan. 24, 2008, which is a continuation-in-part of U.S. Utility application Ser. No. 11/671,601, filed Feb. 6, 2007 now U.S. Pat. No. 7,875,388, and claims priority to U.S. Provisional Application Ser. Nos. 60/911,877; 60/911,878; and 60/911,879, all filed Apr. 14, 2007, the disclosures of which are herein incorporated by reference in their entirety.

FIELD

Provided are electrode compositions for lithium-ion electrochemical cells that include novel binders and battery packs that include electrodes made with these compositions.

BACKGROUND

Powdered alloys of main group elements and conductive powders such as carbon black have been used to make electrodes for lithium-ion cells in a process that involves mixing the powdered active ingredients with a polymeric binder such as polyvinylidene fluoride. The mixed ingredients are prepared as a dispersion in a solvent for the polymeric binder, and coated onto a metal foil substrate, or current collector. The resulting composite electrode contains the powdered active ingredient in the binder adhered to the metal substrate.

Many polymers, such as polyvinylidene fluoride, aromatic and aliphatic polyimides, and polyacrylates have been used as binders for metal and graphite-based lithium-ion cell electrodes. However, the first cycle irreversible capacity loss in the resulting cells can be unacceptably large, e.g., as large as 300 mAh/g or more for an electrode based on a powdered metal material. Secondary electrochemical cells, such as lithium-ion cells, are capable of being reversibly charged and discharged multiple times. In the case of lithium-ion batteries, the charging and the discharging of the lithium-ion electrochemical cells are accomplished by lithiating and delithiating the cell electrodes. When lithium-ion cells are constructed, they usually contain excess lithium ions in the positive electrode and no lithium ions in the negative electrode. During the initial cycling reaction of the cells (charging), lithium transfers from the positive electrode to the negative electrode until the negative electrode has reached its capacity of absorbing lithium ions. Upon the first discharge, the lithium ions migrate from the lithiated negative electrode back to the positive electrode. Typically, after the first charging not all of the lithium ions in the negative electrode are able to migrate out of the negative electrode. This results in what is known as irreversible loss in the capacity of the cell. Loss in the capacity of a cell from additional cycling (after the first cycle) is called capacity fade. This can be for a variety of reasons including changes in the morphology of the active electrode material upon repeated cycling, a buildup of insulating layers on the active electrode material upon repeated cycling or other reasons. A desirable lithium-ion cell is one that has low irreversible capacity loss after the initial cycling, and has low capacity loss (fade) after multiple cycles.

SUMMARY

In view of the foregoing, we recognize that there is a need for electrodes that undergo reduced first cycle capacity loss (irreversible capacity loss) and reduced capacity fade. In addition there is a need for electrodes that have high thermal stability and improved safety characteristics.

In one aspect, provided are electrode compositions that include a powdered material capable of undergoing lithiation and delithiation, wherein the powdered material is selected from tin, a tin alloy, carbon, and a combination thereof, and a nonelastic binder comprising a lithium polyacrylate.

In another aspect, provided is an electrode composition for a negative electrode that includes a powdered material capable of undergoing lithiation and delithiation, wherein the powdered material is selected from tin, a tin alloy, silicon, silicon alloy carbon, and a combination thereof, and a nonelastic binder comprising a lithium polyacrylate, wherein more than 100% to about 107% of the carboxylic acid groups have been neutralized In yet another aspect, provided is an electrode composition that include a powdered material capable of undergoing lithiation and delithiation, wherein the powdered material is selected from tin, a tin alloy, silicon, a silicon alloy, carbon, and a combination thereof, and a binder selected from a lithium polystyrenesulfonate, a lithium polysulfonate fluoropolymer, a lithium salt of a copolymer that includes maleic acid or a sulfonic acid, a polyacrylonitrile polymer, a cured phenolic resin, cured glucose, and combinations thereof.

In another aspect, provided is an electrode composition for a positive electrode that includes a powdered material capable of undergoing lithiation and delithiation, wherein the powdered material is selected from $LiCoO_2$; a lithium metal oxide comprising cobalt, manganese, and nickel; $Fe_2O_3$; $Li_{4/3}Ti_{5/3}O_4$; $LiV_3O_8$; $LiV_2O_5$; $LiCo_{0.2}Ni_{0.8}O_2$; $LiNiO_2$; $LiFePO_4$; $LiMnPO_4$; $LiCoPO_4$; $LiMn_2O_4$; and a combination thereof; and a binder selected from a lithium polystyrenesulfonate, a lithium polysulfonate fluoropolymer, a lithium salt of a copolymer that includes maleic acid or a sulfonic acid, a polyacrylonitrile polymer, a cured phenolic resin, cured glucose, and combinations thereof.

In yet another aspect, provided is an electrochemical cell that includes a positive electrode, a negative electrode, an electrolyte, wherein at least one of electrodes comprises a provided electrode composition.

In yet a further aspect, provided is a method of making an electrode that includes providing a current collector, providing a powdered material capable of undergoing lithiation and delithiation, wherein the powdered material is selected from tin; a tin alloy; carbon; $LiCoO_2$; a lithium metal oxide comprising cobalt, manganese, and nickel; $Fe_2O_3$; $Li_{4/3}Ti_{5/3}O_4$; $LiV_3O_8$; $LiV_2O_5$; $LiCo_{0.2}Ni_{0.8}O_2$; $LiNiO_2$; $LiFePO_4$; Li $MnPO_4$; $LiCoPO_4$; $LiMn_2O_4$; and a combination thereof; and applying to the current collector a coating that comprises the powdered material and a nonelastic binder comprising a lithium polyacrylate.

Finally, in another aspect, provided is a method of making an electrode that includes providing a current collector, providing a powdered material capable of undergoing lithiation and delithiation, wherein the powdered material is selected from tin, a tin alloy, silicon, a silicon alloy, carbon; $LiCoO_2$; a lithium metal oxide comprising cobalt, manganese, and nickel; $Fe_2O_3$; $Li_{4/3}Ti_{5/3}O_4$; $LiV_3O_8$; $LiV_2O_5$; $LiCo_{0.2}Ni_{0.8}O_2$; $LiNiO_2$; $LiFePO_4$; $LiMnPO_4$; $LiCoPO_4$; $LiMn_2O_4$; and a combination thereof; and applying to the current collector a coating that comprises the powdered material and a binder selected from a lithium polystyrenesulfonate, a lithium polysulfonate fluoropolymer, a lithium salt of a copolymer that includes maleic acid or a sulfonic acid, a polyacrylonitrile polymer, a cured phenolic resin, cured glucose, and combinations thereof.

The use of the provided novel binders can provide reduced irreversible capacity and fade. The irreversible first cycle capacity loss in these electrodes can be significantly decreased by forming the electrode using a lithium polysalt binder. The provided binders can be used to prepare electrodes and cells that exhibit decreased first cycle irreversible capacity loss compared to electrodes or cells made with conventional polymeric binders.

The provided novel binders can improve cycle life in rechargeable lithium-ion cells employing electrodes based on small particle alloy powders. The disclosed binders can also allow fabrication of rechargeable lithium-ion cells having improved capacities and reduced capacity fade.

In this application:

"a", "an", and "the" are used interchangeably with "at least one" to mean one or more of the elements being described;

"metal" refers to both metals and to metalloids such as silicon and germanium, whether in an elemental or ionic state;

"alloy" refers to a mixture of two or more metals;

"lithiate" and "lithiation" refer to a process for adding lithium to an electrode material;

"delithiate" and "delithiation" refer to a process for removing lithium from an electrode material;

"active" refers to a material that can undergo lithiation and delithiation;

"charge" and "charging" refer to a process for providing electrochemical energy to a cell;

"discharge" and "discharging" refer to a process for removing electrochemical energy from a cell, e.g., when using the cell to perform desired work;

"positive electrode" refers to an electrode (often called a cathode) where electrochemical reduction and lithiation occurs during a discharging process;

"negative electrode" refers to an electrode (often called an anode) where electrochemical oxidation and delithiation occurs during a discharging process; and "polyelectrolyte" refers to polymers or copolymers that have repeating units that bear an electrolyte group. Electrolyte groups are salts or charged moities either on the ends of polymers or on pendant groups of polymers that dissociate in water making the polymers water-soluble and charged. Examples of electrolyte groups include salts of carboxylic, sulfonic, phosphonic or any other acidic groups.

Unless the context clearly requires otherwise, the terms "aliphatic", "cycloaliphatic" and "aromatic" include substituted and unsubstituted moieties containing only carbon and hydrogen, moieties that contain carbon, hydrogen and other atoms (e.g., nitrogen or oxygen ring atoms), and moieties that are substituted with atoms or groups that may contain carbon, hydrogen or other atoms (e.g., halogen atoms, alkyl groups, ester groups, ether groups, amide groups, hydroxyl groups or amine groups).

DETAILED DESCRIPTION

Figure 1:
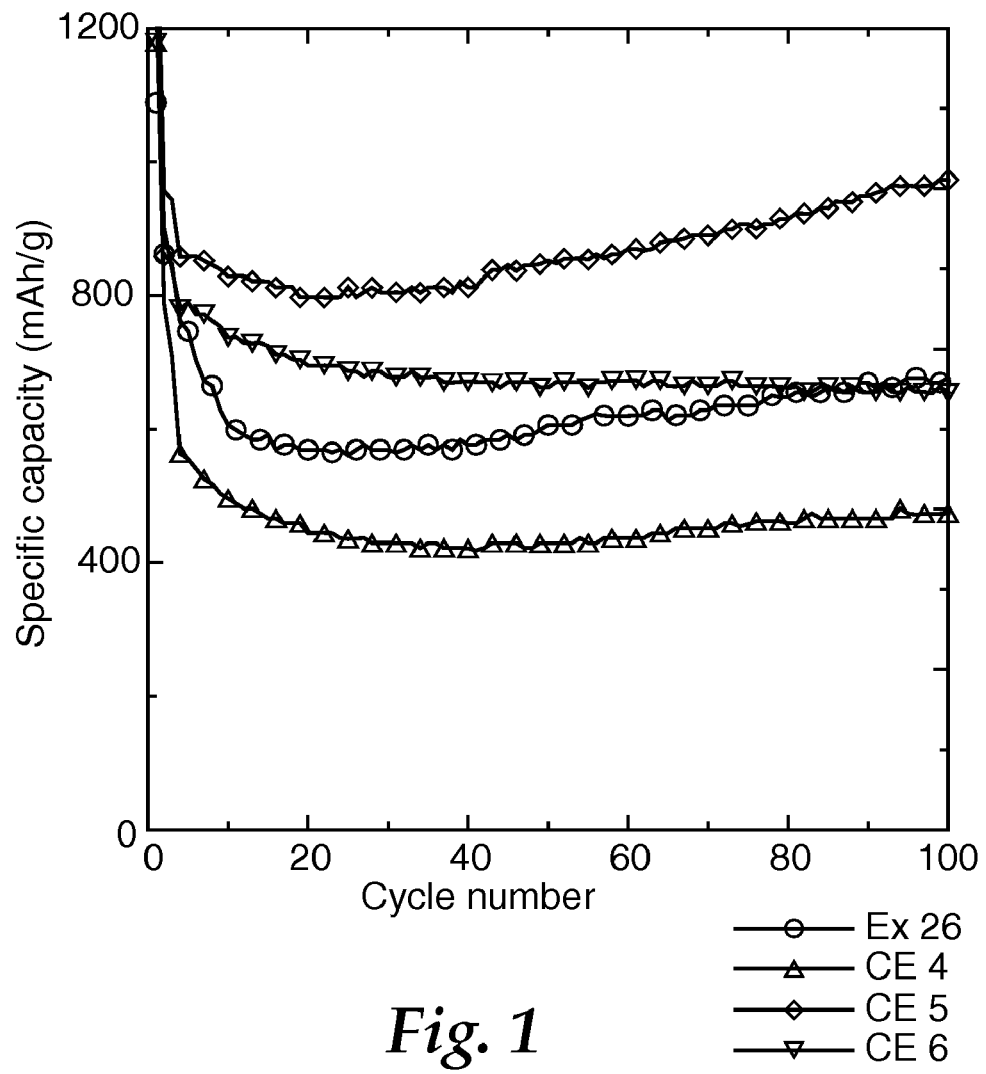
FIG. 1 is a graph of the cycling performance (mAh/g vs. cycle number) of one of the embodiments of the provided electrodes when incorporated into a 2325 coin cell.

The recitation of numerical ranges includes all numbers within that range (e.g., 1 to 5 includes 1, 1.5, 2, 2.75, 3, 3.80, 4, and 5). All numbers are herein assumed to be modified by the term "about".

Provided are electrode compositions that can be used in negative or positive electrodes. A variety of powdered materials can be employed to make the electrode compositions. Exemplary powdered materials can, for example, contain carbon, silicon, silver, lithium, tin, bismuth, lead, antimony, germanium, zinc, gold, platinum, palladium, arsenic, aluminum, gallium, indium, thallium, molybdenum, niobium, tungsten, tantalum, iron, copper, titanium, vanadium, chromium, nickel, cobalt, zirconium, yttrium, a lanthanide, an actinide or an alloy containing any of the foregoing metals or metalloids and other powdered active metals and metalloids that will be familiar to those skilled in the art. Graphitic carbon powder can also be used to make the disclosed electrode compositions. Exemplary powders can have a maximum length in one dimension that is no greater than 60 μm, no greater than 40 μm, no greater than 20 μm, or even smaller. The powders can, for example, have a maximum particle diameter that is submicron, at least 1 μm, at least 2 μm, at least 5 μm, at least 10 μm or even larger. For example, suitable powders often have a maximum dimension of 1 μm to 60 μm, 10 μm to 60 μm, 20 μm to 60 μm, 40 μm to 60 μm, 1 μm to 40 μm, 2 μm to 40 μm, 10 μm to 40 μm, 5 μm to 20 μm, or 10 μm to 20 μm. The powdered materials can contain optional matrix formers within powder particles. Each phase originally present in the particle (i.e., before a first lithiation) can be in contact with the other phases in the particle. For example, in particles based on a silicon:copper:silver alloy, a silicon phase can be in contact with both a copper silicide phase and a silver or silver alloy phase. Each phase in a particle can for example have a grain size less than 500 Angstroms, less than 400 Angstroms, less than 300 Angstroms, less than 200 Angstroms, less than 150 Angstroms, or even smaller.

Exemplary silicon-containing powdered materials useful in this invention include the silicon alloys wherein the powdered material comprises from about 65 to about 85 mole % (mole percent) silicon, from about 5 to about 12 mole % iron, from about to about 12 mole % titanium, and from about 5 to about 12 mole % carbon. Additional examples of useful silicon alloys include compositions that include silicon, copper, and silver or silver alloy such as those discussed in U.S. Pat. Appl. Publ. No. 2006/0046144 A1 (Obrovac et al); multiphase, silicon-containing electrodes such as those discussed in U.S. Pat. No. 7,498,180 (Christensen et al); silicon alloys that contain tin, indium and a lanthanide, actinide element or yttrium such as those described in U.S. Pat. Nos. 7,851,085; 7,871,727; and 7,767,349 (all to Obrovac et al.) amorphous alloys having a high silicon content such as those discussed in U.S. Pat. No. 7,732,095 (Christensen et al); and other powdered materials used for negative electrodes such as those discussed in U.S. Pat. Appl. Publ. No. 2007/0269718 U.S. Pat. No. 7,771,861 (both Krause et al.).

Other exemplary materials useful in the provided compositions include tin, a tin alloy, carbon, and a combination thereof. Tin alloys that are useful in embodiments of the provided compositions can include aluminum, titanium, iron, indium, rare earth metals, yttrium, and silicon. Tin alloys are alloys wherein the largest weight percent (wt %) of the alloy is tin. When the tin alloys include silicon, the amount of silicon in the alloy is less than the weight percent of tin in the alloy, less than 80 wt % of the amount of tin in the alloy, less than 70 wt % of tin in the alloy, less than 60 wt % of tin in the alloy, less than 50 wt % of tin in the alloy, less than 25 wt % of tin in the alloy, less than 10 wt % of tin in the alloy, less than 5 wt % of tin in the alloy, or even less.

Useful active materials for making positive electrodes of the electrochemical cells and batteries or battery packs of this invention include lithium compounds, such as $Li_{4/3}Ti_{5/3}O_4$, $LiV_3O_8$, $LiV_2O_5$, $LiCo_{0.2}Ni_{0.8}O_2$, $LiNiO_2$, $LiFePO_4$, $LiMnPO_4$, $LiCoPO_4$, $LiMn_2O_4$, and $LiCoO_2$; the positive active material compositions that include mixed metal oxides of cobalt, manganese, and nickel such as those described in U.S. Pat. Nos. 6,964,828; 7,078,128 (Lu et al.); and nanocomposite positive active materials such as those discussed in U.S. Pat. No. 6,680,145 (Obrovac et al.).

Exemplary powdered materials useful for making negative electrodes of his invention include U.S. Pat. Nos. 6,203,944 and 6,699,336 (both Turner et al.); U.S. Pat. Publ. No. 2003/0211390 (Dahn et al.); U.S. Pat. No. 6,255,017 (Turner) and U.S. Pat. No. 6,436,578 (Turner et al.); graphitic carbon that exists in forms such as powders, flakes, fibers or spheres (e.g., mesocarbon microbeads (MCMB)); metal oxide powders that include vanadium such as those described in US2005/0079417 A1 (Kim et al.), US2005/0164090 A1 (Kim et al.), US2006/0088766 A1 (Kim et al.) and US2007/0166615 A1 (Takamuku et al.); metal oxide powders that include vanadium such as those described in U.S. Pat. Publ. Nos. 2005/0079417, 2005/0164090, and 2006/0088766 (all Kim et al.), and U.S. Pat. Publ. No. 2007/0166615 (Takamuku et al.); combinations thereof and other powdered materials that will be familiar to those skilled in the art. Each of the foregoing references is incorporated herein in its entirety.

Other powdered negative electrode active materials that can be used with the provided binders include active materials that include an alloy material capable alloying with Li and at least one element with an atomic number of 20 or less, except for H, Li and noble gases. The alloy material can include, for example, Sn and at least one metal, such as Ni, Cu, Fe, Co, Mn, Zn, In, and Ag. The element with an atomic number of 20 or less can include B, C, Al, Si, P, or S. The negative electrode active material can have a low-crystalline or amorphous structure so that Li can be smoothly inserted and extracted. The content of the element with an atomic number of 20 or less can be within a range from about 10 weight percent (wt %) to about 50 wt %.

Another example of provided negative electrode active material contains tin, cobalt, and carbon, and further contains at least one from the group consisting of indium, niobium, germanium, titanium, molybdenum, aluminum, phosphorous, and bismuth. The carbon content of this negative electrode active material is from about 9.9 wt % to about 29.7 wt %, and the ratio of cobalt to the total of tin and cobalt is from about 30 wt % to about 70 wt %. Also, provided are useful negative electrode materials are alloy powders containing at least one element selected from the Group 14 elements other than carbon and the Group 13 elements other than thallium.

Other useful negative electrode materials include a reaction phase containing an element capable of generating an intermetallic compound with Li and C. In this reaction phase, a half value width of a diffraction peak by X-ray diffraction is preferably 0.5° or more.

Powdered alloy particles can include a conductive coating. For example, a particle that contains silicon, copper, and silver or a silver alloy can be coated with a layer of conductive material (e.g., with the alloy composition in the particle core and the conductive material in the particle shell). Suitable conductive materials include, for example, carbon, copper, silver, or nickel.

Exemplary powdered alloy materials can be prepared by any known means, for example, by physically mixing and then milling the various precursor components to the alloys. The mixing can be by simple blending or by melt spinning Melt spinning includes a process in which an alloy composition can be melted in a radio frequency field and then ejected through a nozzle onto a surface of a rotating wheel (e.g., a copper wheel). Because the surface temperature of the rotating wheel is substantially lower than the temperature of the melted alloy, contact with the surface of the rotating wheel quenches the melt. Quenching minimizes the formation of large crystallites that can be detrimental to electrode performance. When conductive coatings are employed, they can be formed using techniques such as electroplating, chemical vapor deposition, vacuum evaporation, or sputtering. Suitable milling can be done by using various techniques such as vertical ball milling, horizontal ball milling, or other milling techniques known to those skilled in the art.

The electrode composition can contain additives such as will be familiar to those skilled in the art. The electrode composition can include an electrically conductive diluent to facilitate electron transfer from the powdered material to a current collector. Electrically conductive diluents include, but are not limited to, carbon (e.g., carbon black for negative electrodes and carbon black, flake graphite and the like for positive electrodes), metal, metal nitrides, metal carbides, metal silicides, and metal borides. Representative electrically conductive carbon diluents include carbon blacks such as SUPER P and SUPER S carbon blacks (both from MMM Carbon, Belgium), SHAWANIGAN BLACK (Chevron Chemical Co., Houston, Tex.), acetylene black, furnace black, lamp black, graphite, carbon fibers, and combinations thereof.

The electrode composition can include an adhesion promoter that promotes adhesion of the powdered material or electrically conductive diluent to the binder. The combination of an adhesion promoter and binder can help the electrode composition better accommodate volume changes that can occur in the powdered material during repeated lithiation/delithiation cycles. The provided binders can offer sufficiently good adhesion to metals and alloys so that addition of an adhesion promoter may not be needed. If used, an adhesion promoter can be made a part of the binder (e.g., in the form of an added functional group), can be a coating on the powdered material, can be added to the electrically conductive diluent, or can be a combination of such measures. Examples of adhesion promoters include silanes, titanates, and phosphonates as described in U.S. Pat. Publ. No. 2004/0058240 (Christensen).

Provided binders include lithium polysalts. Lithium polysalts include lithium polyacrylates (including polymethacrylates), lithium polystyrenesulfonates, and lithium polysulfonate fluoropolymers. The lithium polysalts are available from the corresponding acrylic or sulfonic acids by neutralization of the acidic groups with basic lithium. Commonly lithium hydroxide is used to neutralize acid groups. It is also within the scope of this application to replace other cations, such as sodium, with lithium by ion exchange. For example, an ion exchange resin such as SKT10L (available from Mitsubishi Chemical Industries under the trade name, DIAN-ION), can be used to exchange sodium ion for lithium ion.

While not being bound by theory, it is believed that lithium polysalts can coat powdered active materials and form a layer which is ionically conductive. Since lithium-ion electrochemical cells depend upon lithium ion conductivity this enhances the ability of electrodes made with these binders to have extended life and reduced fade. Additionally, it is believed that the provided lithium polysalts coat the powdered active materials thinly enough that some electrical conductivity is maintained. Finally, it is believed that the lithium polysalts can suppress the formation of insulating SEI (solvent electrolyte interface) layers that are known by those skilled in the art to lead to premature lithium-ion electrode failure on repeated cycling.

The binders of this disclosure include at least about 50%, at least about 60% at least about 70%, at least about 80%, at least about 90%, or even more, on a molar basis of lithium based upon the molar equivalents of acidic groups (on the ends or on pendant groups) of the acid from which the polysalt is derived. Acidic groups that can be neutralized include carboxylic acid, sulfonic acid, phosphonic acid, and any other acidic group that has one proton to exchange that are commonly found on polymers. Examples of commercial materials that are useful in this invention include perfluorosulfonic acide polymers such as NAPHION (available from DuPont, Wilmington, Del.), and thermoplastic ionomeric polymers such as SURLYN (also from Dupont). Other materials that are useful in this disclosure are disclosed below and also include materials disclosed in U.S. Pat. No. 7,875,388 (Le), U.S. Pat. Appl. Publ. No. 2010/0075226. These applications disclose binders that contain lithium polysalts such as lithium polyacrylates, lithium polysulfonate fluoropolymers, or lithium sytrenesulfonates. Other materials of interest include lithium polyimides such as those described in U.S. Pat. No. 6,287,722 (Barton et al.).

Lithium polyacrylate can be made from poly(acrylic acid) that is neutralized with lithium hydroxide. In this application, poly(acrylic acid) includes any polymer or copolymer of acrylic acid or methacrylic acid or their derivatives where at least about 50 mole %, at least about 60 mole %, at least about 70 mole %, at least about 80 mole %, or at least about 90 mole % of the copolymer is made using acrylic acid or methacrylic acid. Useful monomers that can be used to form these copolymers include, for example, alkyl esters of acrylic or methacrylic acid that have alkyl groups with 1-12 carbon atoms (branched or unbranched), acrylonitriles, acrylamides, N-alkyl acrylamides, N,N-dialkylacrylamides, hydroxyalkylacrylates, maleic acid, propanesulfonates, and the like. Of particular interest are polymers or copolymers of acrylic acid or methacrylic acid that are water soluble—especially after neutralization or partial neutralization. Water solubility is typically a function of the molecular weight of the polymer or copolymer and/or the composition. Poly(acrylic acid) is very water soluble and is preferred along with copolymers that contain significant mole fractions of acrylic acid. Poly(methacrylic) acid is less water soluble—particularly at larger molecular weights.

Homopolymers and copolymers of acrylic and methacrylic acid that are useful in this invention can have a molecular weight ($M_w$) of greater than about 10,000 grams/mole, greater than about 75,000 grams/mole, or even greater than about 450,000 grams/mole, or even higher. The homopolymers and copolymer that are useful in this invention have a molecular weight ($M_w$) of less than about 3,000,000 grams/mole, less than about 500,000 grams/mole, less than about 450,000 grams/mole, or even lower. Carboxylic acidic groups on the polymers or copolymers can be neutralized by dissolving the polymers or copolymers in water or another suitable solvent such as tetrahydrofuran, dimethylsulfoxide, N,N-dimethylformamide, or one or more other dipolar aprotic solvents that are miscible with water. The carboxylic acid groups (acrylic acid or methacrylic acid) on the polymers or copolymers can be titrated with an aqueous solution of lithium hydroxide. For example, a solution of 34 wt % poly (acrylic acid) in water can be neutralized by titration with a 20 wt % solution of aqueous lithium hydroxide. Typically, 50% or more, 60% or more, 70% or more, 80% or more, 90% or more, 100% or more, 107% or more of the carboxylic acid groups are lithiated (neutralized with lithium hydroxide) on a molar basis. When more than 100% of the carboxylic acid groups have been neutralized this means that enough lithium hydroxide has been added to the polymer or copolymer to neutralize all of the groups with an excess of lithium hydroxide present.

Lithium polysulfonate fluoropolymers can be made from the corresponding polysulfonic acid fluoropolymers by neutralizing the polysulfonic acid fluoropolymers with a base such as lithium hydroxide. The sulfonic acid groups on the polymers can be titrated with an aqueous solution of lithium hydroxide. For example, a solution of 8.8% polysulfonic acid fluoropolymer in water can be neutralized by titration with a 20 wt % of aqueous lithium hydroxide. Typically, 50% or more, 60% or more, 70% or more, 80% or more, 90% or more, or all of the sulfonic acid groups are lithiated (neutralized with lithium hydroxide) on a molar basis.

In this application, polysulfonate fluoropolymers include fluoropolymers having pendant groups terminating in sulfonic acid groups. The polysulfonate fluoropolymers can be derived from polysulfonic acid fluoropolymers that comprise a highly fluorinated backbone and pendant groups, wherein the pendent groups comprise:

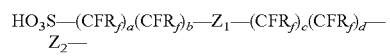

wherein each of a, b, c, and d independently ranges from 0-3, c+d is at least one, $Z_1$ and $Z_2$ are an oxygen atom or a single bond, and each $R_f$ is independently either F or a substantially fluorinated, branched or unbranched fluoroalkyl, fluoroalkoxyl, or fluoroether group that contains 1 to 15 carbon atoms and 0 to 4 oxygen atoms in the fluoroalkyl, fluoroalkoxyl, or fluoroether chain. Examples of suitable pendant groups include —$OCF_2CF(CF_3)OCF_2CF_2SO_3H$; —$O(CF_2)_4SO_3H$, and combinations thereof.

The fluoropolymer can also include one or more acidic endgroups, such as sulfonyl endgroups having the formula —$SO_3H$. In one embodiment of the present invention the backbone chain of the fluoropolymer is perfluorinated. Other suitable polysulfonate fluoropolymers that can be useful in this invention are disclosed in U.S. Pat. No. 6,287,722 (Burton et al.); U.S. Pat. Publ. No. 2001/0121210 (Hamrock et al.) which references U.S. Pat. No. 6,624,328 (Guerra) and U.S. Pat. Publ. No. 2004/0116742 (Guerra); and U.S. Pat. No. 7,517,604 (Hamrock et al.). Other materials useful in this disclosure include lithium polysulfonate fluoropolymers derived from copolymers of tetrafluoroethylene (TFE) and a co-monomer according to the formula: $FSO_2$—$CF_2$—$CF_2$—$O$—$CF(CF_3)$—$CF_2$—$O$—$CF$=$CF_2$. These are known and sold in sulfonic acid form, i.e., with the $FSO_2$— end group hydrolyzed to $HSO_3$—, under the trade name NAFION by DuPont Chemical Company, Wilmington, Del.

U.S. Pat. Nos. 4,358,545 and 4,417,969 (both to Ezell et al.) disclose polymers and ion exchange membranes thereof having a hydration product of less than about 22,000 and equivalent weights of 800-1500, which have a substantially fluorinated backbone and pendant groups according to the formula: $YSO_3—(CFR^1{}_f)_c(CFR^2{}_f)_d—O$-backbone, where Y is hydrogen or an alkali metal, $R^1{}_f$ and $R^2{}_f$ are substantially fluorinated alkyl groups, c is 0-3, d is 0-3, and c+d is at least 1. These materials can be used to derive (by neutralization) lithium polysulfonate fluoropolymers that are useful in some embodiments of the provided compositions and methods.

Lithium polystyrenesulfonates can be made from the corresponding polystyrenesulfonic acids by neutralizing the polystyrenesulfonic acids with a base such as lithium hydroxide. The sulfonic acid groups on the polymers can be titrated with an aqueous solution of lithium hydroxide. For example, a solution of 5% polystyrenesulfonic acid in water can be neutralized by titration with a 20% by weight solution of aqueous lithium hydroxide. Typically, 50% or more, 60% or more, 70% or more, 80% or more, 90% or more, or all of the sulfonic acid groups are neutralized with lithium hydroxide on a molar basis. Alternatively, sodium polystyrenesulfonate is available as a solution in 70,000 and 500,000 molecular weight from Polysciences, Inc., Warrington, Pa. and the sodium can be exchanged for lithium by passage through a lithium loaded cation exchange resin. Polystyrenesulfonates with molecular weights of from about 10,000 to about 2,000,000 can be useful in this invention. Provided polystyrenesulfonates include polymers or copolymers of styrenesulfonic acid. In most instances there can be one sulfonic acid group on the benzene ring of the styrene moiety. It can usually be in the para or 3-position on the ring. The benzene ring of the styrene can be further substituted with other groups including, but not limited to, branched or unbranched alkyl or alkoxy groups containing from about 1 to about 6 carbon atoms. In addition other substitution can be possible as long as the substituent does not materially interfere with the acidity of the sulfonic acid group.

Sulfonated polymers that can be useful as binders include poly(aryl sulfonates) such as polystyrenesulfonate, copolymers of styrene sulfonate, such as the copolymer of styrene sulfonate and maleic anhydride; copolymers of acrylamide and 2-methyl-1-propanesulfonate; homopolymers and copolymers of vinylsulfonates, homopolymers and copolymers of allyl sulfonates and homopolymers and copolymers of alkyl vinyl benzene sulfonates. Other potentially useful polymers for the provided binders can be found in U.S. Pat. No. 5,508,135 (Lelental et al.).

In another embodiment provided are polyacrylonitrile-based binders for alloy negative electrode compositions. Polyacrylonitrile (PAN) is known to react in air at temperatures from 200° C. to 300° C. to form ribbon-like polymeric carbon known as "black orlon". Scheme (I) shows the thermal chemistry of polyacrylonitrile (PAN).

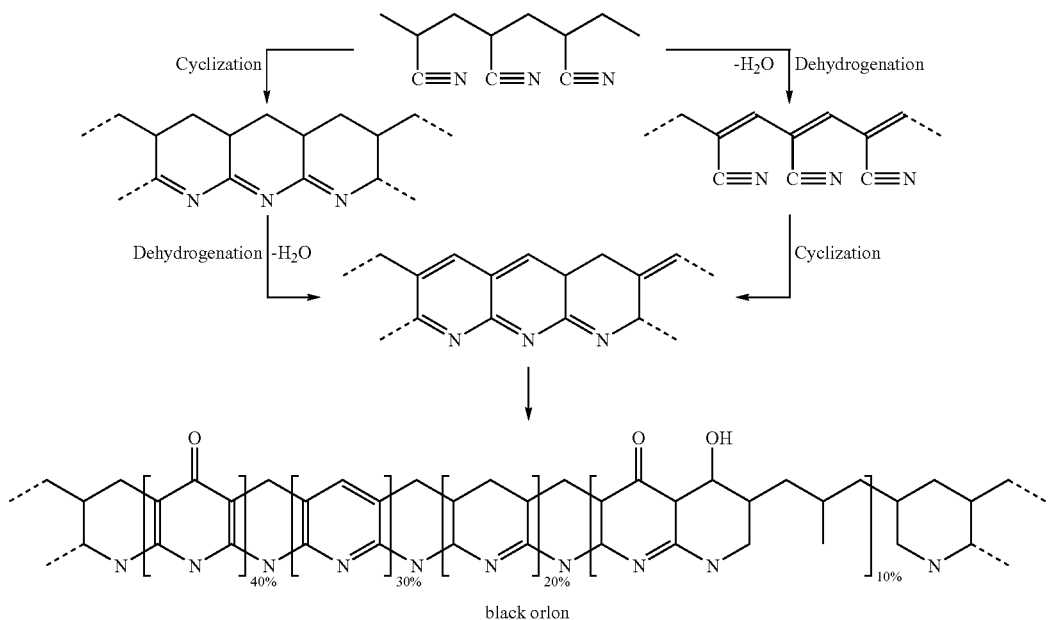

black orlon

Black orlon is a ladder polymer that has very good thermal and mechanical stability. Electrodes that were constructed using black orlon as a binder had similar electrochemical performance to those made with polyimide (PI).

In another embodiment, provided are binders that comprise organic polymers and simple organic substances that are cured in an inert atmosphere at a temperature greater than 200° C. Included are phenolic resins such as those discussed in U.S. Pat. Nos. 7,150,770 and 7,150,771 (both to Keipert et al.) and molecules such as glucose.

The provided binders can be mixed with other polymeric materials to make a blend of materials. This may be done, for example, to increase the adhesion, to provide enhanced conductivity, to change the thermal properties, or to affect other physical properties of the binder. The binders of this invention, however, are non-elastomeric. By non-elastomeric it is meant that the binders do not contain substantial amounts of natural or synthetic rubber. Synthetic rubbers include styrene-butadiene rubbers and latexes of styrene-butadiene rubbers. For example, the binders of this invention contain less than 20 wt %, less than 10 wt %, less than 5 wt %, less than 2 wt %, or even less of natural or synthetic rubber.

A variety of electrolytes can be employed in the disclosed lithium-ion cell. Representative electrolytes contain one or more lithium salts and a charge-carrying medium in the form of a solid, liquid, or gel. Exemplary lithium salts are stable in the electrochemical window and temperature range (e.g. from about −30° C. to about 70° C.) within which the cell electrodes can operate, are soluble in the chosen charge-carrying media, and perform well in the chosen lithium-ion cell. Exemplary lithium salts include $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, and combinations thereof. Exemplary charge-carrying media are stable without freezing or boiling in the electrochemical window and temperature range within which the cell electrodes can operate, are capable of solubilizing sufficient quantities of the lithium salt so that a suitable quantity of charge can be transported from the positive electrode to the negative electrode, and perform well in the chosen lithium-ion cell. Exemplary solid charge carrying media include polymeric media such as polyethylene oxide, polytetrafluoroethylene, polyvinylidene fluoride, fluorine-containing copolymers, polyacrylonitrile, combinations thereof, and other solid media that will be familiar to those skilled in the art. Exemplary liquid charge carrying media include ethylene carbonate, propylene carbonate, dimethyl carbonate, diethyl carbonate, ethyl methyl carbonate, butylene carbonate, vinylene carbonate, fluoroethylene carbonate, fluoropropylene carbonate, γ-butylrolactone, methyl difluoroacetate, ethyl difluoroacetate, dimethoxyethane, diglyme (bis(2-methoxyethyl)ether), tetrahydrofuran, dioxolane, combinations thereof and other media that will be familiar to those skilled in the art. Exemplary charge carrying media gels include those described in U.S. Pat. No. 6,387,570 (Nakamura et al.) and U.S. Pat. No. 6,780,544 (Noh). The charge carrying media solubilizing power can be improved through addition of a suitable cosolvent. Exemplary cosolvents include aromatic materials compatible with lithium-ion cells containing the chosen electrolyte. Representative cosolvents include toluene, sulfolane, dimethoxyethane, combinations thereof and other cosolvents that will be familiar to those skilled in the art. The electrolyte can include other additives that will familiar to those skilled in the art. For example, the electrolyte can contain a redox chemical shuttle such as those described in U.S. Pat. No. 5,709,968 (Shimizu), U.S. Pat. No. 5,763,119 (Adachi), U.S. Pat. No. 5,536,599 (Alamgir et al.), U.S. Pat. No. 5,858,573 (Abraham et al.), U.S. Pat. No. 5,882,812 (Visco et al.), U.S. Pat. No. 6,004,698 (Richardson et al.), U.S. Pat. No. 6,045,952 (Kerr et al.), and U.S. Pat. No. 6,387,571 (Lain et al.); and in U.S. Pat. Publ. Nos. 2005/0221168, 2005/0221196, 2006/0263696, and 2006/0263697 (all to Dahn et al.).

The provided electrochemical cells can be made by taking at least one each of a positive electrode and a negative electrode as described above and placing them in an electrolyte. Typically, a microporous separator, such as CELGARD 2400 microporous material, available from Celgard LLC, Charlotte, N.C., can be used to prevent the contact of the negative electrode directly with the positive electrode. Electrochemical cells made with the provided negative electrodes and binders showed reduced irreversible capacity loss and less fade than similar cells containing negative electrodes with conventional binders.

The provided cells can be used in a variety of devices, including portable computers, tablet displays, personal digital assistants, mobile telephones, motorized devices (e.g., personal or household appliances and vehicles), instruments, illumination devices (e.g., flashlights) and heating devices. One or more of the provided electrochemical cells can be combined to provide battery pack. Further details regarding the construction and use of rechargeable lithium-ion cells and battery packs will be familiar to those skilled in the art.

The invention is further illustrated in the following illustrative examples, in which all parts and percentages are by weight percent (wt %) unless otherwise indicated.

EXAMPLES

Preparatory Example 1

Preparation of $Si_{70}Fe_{10}Ti_{10}C_{10}$ Alloy $Si_{70}Fe_{10}Ti_{10}$ was prepared by melting silicon lumps (65.461 g) (Alfa Aesar/99.999%, Ward Hill, Miss.), iron pieces (18.596 g) (Alfa Aesar/99.97%) and titanium sponge (15.943 g) (Alfa Aesar/99.7%) in an ARC furnace. The alloy ingot of $Si_{70}Fe_{10}Ti_{10}$ was broken into small chunks and was treated in a hammer mill to produce alloy powder particles having an average particle size of 150 μm.

$Si_{70}Fe_{10}Ti_{10}C_{10}$ alloy was made from $Si_{70}Fe_{10}Ti_{10}$ alloy powder (described above) and graphite (TIMREX SFG44, TimCal Ltd., Bodio, Switzerland) by reactive ball milling in a high kinetic ball mill (SIMOLOYER, CM20-201m, Zoz GmbH, Wenden, Germany). A sample of 1.4423 kg of $Si_{70}Fe_{10}Ti_{10}$ alloy powder, 0.0577 kg graphite and 25 kg of 4.76 mm diameter chromium-steel balls were charged to the mill. The mill was operated for 180 cycles where each cycle consisted of 45 sec at 550 revolutions per minutes (rpm) and then 15 sec at 300 rpm. The total milling time was 3 hrs. The mill was cooled by chilled water during the milling.

Preparatory Example 2

$Si_{66.4}Fe_{11.2}Ti_{11.2}C_{11.2}$ Alloy Powder

The alloy composition, $Si_{74.8}Fe_{12.6}Ti_{12.6}$ was prepared by melting silicon lumps (123.31 g)(Alfa Aesar/99.999%, Ward Hill, Miss.), iron pieces (41.29 g) (Alfa Aesar/99.97%) and titanium sponge (35.40 g) (Alfa Aesar/99.7%) in an ARC furnace. The alloy ingot was broken into small chunks and was treated in a hammer mill to produce alloy powder particles of approximately 150 μm.

The $Si_{66.4}Fe_{11.2}Ti_{11.2}C_{11.2}$ alloy was made from $Si_{74.8}Fe_{12.6}Ti_{12.6}$ alloy powder (2.872 g) and graphite (0.128 g) (TIMREX SFG44, TimCal Ltd, Bodio, Switzerland) by reactive ball milling in a Spex mill (Spex CERTIPREP Group, Metuchen, N.J.) with sixteen tungsten carbide balls (3.2 mm diameter) for one hour in an argon atmosphere.

Preparatory Example 3

Preparation of Lithium Polyacrylate

Lithium polyacrylate was made by adding an aqueous solution of lithium hydroxide solution to an aqueous poly (acrylic acid) solution. Different molar ratios of lithium hydroxide and carboxylic acid groups were used. Typically a 20 wt % aqueous solution of lithium hydroxide and a 34 wt % aqueous solution of poly(acrylic acid) were used. De-ionized water was added to bring the final solution of lithium polyacrylate to 10 wt % solids. Poly(acrylic acid) of 100,000 ($M_w$) and 250,000 ($M_w$) were obtained as aqueous solutions from Aldrich Chemicals, Milwaukee, Wis. Samples of 65 wt % LiOH neutralized lithium polyacrylate, of both 100,000 $M_w$ and 250,000 $M_w$, were prepared by adding 185.56 g of de-ionized water, 60.41 g of 20 wt % lithium hydroxide solution, and 100 g poly(acrylic acid) (PAA) solution (34 wt % in water). The results were 10 wt % solids solutions of lithium polyacrylate which had been 64% neutralized. The two samples were designated "PAA100k-64% Li salt" and "PAA250k-64% Li salt" respectively.

7.21 g (0.01 mol) of poly(acrylic acid), 450,000 Mw, available from Aldrich Chemical, and 4.20 g (0.01 mol) LiOH.H2O were dissolved in 300.57 g deionized water in a glass jar by rolling on a roller for 1 hr. The resulting solution contained 2.5 wt % lithium polyacrylate.

Additional samples of 107 wt % of neutralized lithium polyacrylate were prepared using both the 100,000 $M_w$ and the 250,000 $M_w$ polymer by adding 149.01 g of de-ionized water and 106.01 g of 20 wt % lithium hydroxide solution to 100 g poly(acrylic acid) solution (34 wt % in water). The results were 10 wt % solids solutions of lithium polyacrylate with a 7 mole % excess of lithium hydroxide. The two samples were designated lithium "PAA100k-107% Li Salt" and "PAA250k-107% LI Salt" respectively.

Preparatory Example 4

Preparation of Lithium Polysulfonate Fluoropolymer

The lithium polysulfonate fluoropolymer used in Examples 9 and 10 was synthesized according to the procedure disclosed in the Example section U.S. Pat. Publ. No. 2004/0121210. Comonomer A in that reference was made according to procedures disclosed in U.S. Pat. Publ. No. 2004/0116742 and U.S. Pat. No. 6,624,328 (both to Guerra). The polysulfonate fluoropolymer used had an equivalent weight of 980.

0.46 g LiOH.H$_2$O (20 wt % solution) was added to 124.66 g (8.8 wt % solids solution in water) of the polysulfonic acid fluoropolymer specified above with an equivalent weight of 980 to form a lithium polysulfonate fluoropolymer.

Preparatory Example 5

Lithium Polysulfonate Solution 75 ml of ion exchange resin (Mitsubishi SKT10L, crosslinked polystyrene with sulfonic acid group from DIANION, ion exchange capacity>1.9 meq/mL) was charged into a glass ion-exchange column. The resin was neutralized with 18.0 g of LiOH—H2O (3× excess, 90 mL of 20 wt % solution in water). The excess of LiOH was washed with water until the outcome water reached a pH of 7. The column was then charged with 3.0 g of poly(styrene sulfonic acid) sodium salt with MW of 500,000 diluted in 60 mL water (from Polysciences Inc.). The ion exchanged product poly (styrene sulfonic acid) Li salt (PSS Li) in water solution (4.18 wt %) was slowly collected under air pressure.

Preparatory Example 6

Synthesis of Poly(ethylene-alt-maleic acid) Li Salt 25.22 g (0.20 mol) poly(ethylene-alt-maleic anhydride), $M_w$ 100,000-500,000, available from Aldrich Chemical Company, Milwaukee, Wis., and 16.78 g (0.04 mol) LiOH.H$_2$O were dissolved in 581.97 g deionized water in a glass jar by rolling on a roller for 1 hr. The resulting solution contained 5 wt % of poly(ethylene-alt-maleic acid) Li salt.

Preparatory Example 7

Synthesis of Poly(acrylic acid-co-maleic acid) Li Salt

Poly(acrylic acid-co-maleic acid) Li salt was made from poly(acrylic acid-co-maleic acid) Na salt (1:1 acrylic acid/ maleic acid, $M_w$ 50,000), available from Aldrich Chemicals, by ion exchange using a cationic ion exchange resin (SKT-20, sulfonic acid form, 1.9 meq/mL), available from Mitsubishi Chemicals that had been preconditioned with a lithium hydroxide solution. 75 ml of the resin and 100 g of the solution of 2 wt % poly(acrylic acid-co-maleic acid) Na salt in water were used. The resulting solution of poly(acrylic acid-co-maleic acid) Li salt was dried in air for 12 hrs at 80° C. to obtain the solid poly(acrylic acid-co-maleic acid) Li salt.

Preparatory Example 8

Synthesis of Poly(methyl vinyl ether-alt-maleic acid) Li Salt 8.71 g (0.05 mol) poly(methyl vinyl ether-alt-maleic acid), $M_w$ 1,980,000, available from Aldrich Chemical, and 4.20 g (0.10 mol) LiOH.H$_2$O were dissolved in 173.12 g deionized water in a glass jar by rolling on a roller for 1 hour. The resulting solution contained 5 wt % poly(methyl vinyl ether-alt-maleic acid) Li salt.

Preparatory Example 9

Synthesis of Poly(2-acrylamido-2-methyl-1-propanesulfonic acid) Li Salt 38.69 g (0.04 mol) of 16.07 wt % poly(2-acrylamido-2-methyl-1-propanesulfonic acid) solution in water, Mw 2,000,000, available from Aldrich Chemical, and 1.26 g (0.04 mol) LiOH.H$_2$O were dissolved in 87.96 g deionized water in a glass jar by rolling on a roller for 1 hour. The resulting solution contained 5 wt % of poly(2-acrylamido-2-methyl-1-propanesulfonic acid) Li salt.

Preparatory Example 10

Preparation of Poly(Acrylic Acid) Li Salt Solution—100% Neutralized

Starting material A: 15.258 g LiOH.H$_2$O (Sigma-Aldrich) was mixed with 137.610 g distilled water using a magnetic stirrer. The formed LiOH.H$_2$O solution was 9.98 wt %. Starting material B: 25 wt % poly(acrylic acid) solution (Alfa Aesar, average N.M. 240,000) 128.457 g of material A was added into 88.045 g material B. The mixture was stirred overnight. The formed solution is 11 wt % poly(acrylic acid) Li salt binder solution.

Electrode Fabrication

Example 1

KETJEN Black conductive carbon (0.024 g) (Akzo Nobel Polymer Chemical LLC, Chicago, Ill.) and PAA100k-64% Li salt (1.36 g of a 10 wt % solids solution in water, were mixed in a 45 mL stainless steel vessel using four 13 μm diameter tungsten carbide balls. The mixing was carried out in a planetary micro mill (PULVERSETTE 7 Model; Fritsch, Germany) at a speed setting of 1 for 30 min. Then $Si_{70}Fe_{10}Ti_{10}C_{10}$ powder (1.20 g), MCMB-1028 graphite (0.64 g) (MMM Carbon, Belgium) and de-ionized water (0.1 g) were added to the mill and the mixing was continued at a speed setting of 2 for 30 min. The resulting solution was coated onto a 13 μm thick Cu foil using a die with a 125 μm gap. The sample was then dried in a vacuum oven at 120° C. for 2 hrs.

Example 2

An electrode based on the composition of Example 2 in Table 1 was prepared by the procedure used for Example 1 except that only 1.84 g of $Si_{70}Fe_{10}Ti_{10}C_{10}$ powder was added to the milled conductive carbon and polymer mixture. The milled coating solution was coated onto copper foil using a 75 μm gap.

Example 3

An electrode based on the composition of Example 3 in Table 1 was prepared by the procedure used for Example 1 except that $Si_{70}Fe_{10}Ti_{10}C_{10}$ powder (1.20 g), SLP30-Graphite (0.64 g) (TIMREX SLP30, TimCal Ltd., Bodio, Switzerland), de-ionized water (1.0 g) and PAA100k-107% Li salt (1.6 g of a 10 wt % solids solution in water) were milled in a single step at a speed setting of 2 for 30 min. The milled solution was spread onto the copper foil using a 3 μm gap.

Example 4

An electrode based on the composition of Example 4 of Table 1 was prepared by the same procedure used for Example 3, except that only 0.2 g of de-ionized water was added. The milled solution was spread onto the copper foil using a 75 μm gap.

Example 5

An electrode based on the composition of Example 5 of Table 1 was prepared by the same procedure used for Example 3, except that 2.5 g of de-ionized water was used with the graphite and the poly(acrylic acid) in the milling step. The milled solution was spread onto the copper foil using a 75 μm gap.

Examples 6 and 7

Electrodes based on the compositions of Example 6 and Example 7 of Table 1 were prepared by the same procedure used for Example 4.

Example 8

An electrode based on the composition of Example 8 in Table 1 was prepared by the same procedure used for Example 5.

Comparative Example 1

Graphite (1.00 g) (MCMB, Grade 6-28, Osaka Gas Co. Osaka-Shi, Japan), $Si_{70}Fe_{10}Ti_{10}C_{10}$ (0.1 gram), polyvinylidene fluoride (KYNAR 741) solution (1.0 g of a 10 wt % in N-methylpyrrolidinone (NMP)), and NMP (2.5 g) were mixed in planetary micro mill as described for Example 1. The mixture was coated and dried as in Example 1.

Comparative Example 2

$Si_{70}Fe_{10}Ti_{10}C_{10}$ powder (2.0 g) and TIMREX SFG44 graphite (2.0 g) were mixed in the micro mill used for Example 1 at a speed setting of 7 for 30 min. This mixture (1.90 grams), polyvinylidene fluoride (KYNAR 741) solution (1.0 g) and NMP (3.0 g) were mixed in the micro mill of Example 1 at a speed setting of 2 for one hr. The mixture was coated and dried as in Example 1.

Test Cell Preparation for Examples 1-8

Disks (16-mm diameter) were cut from the electrode coatings for use in 2325-button cells. Each 2325 cell contains a 18 mm diameter disk of Cu as a spacer (36-mil (900 μm) thick), an 18 mm diameter disk of the alloy electrode, one 20 mm diameter microporous separator (CELGARD 2400; Separation Products, Celgard, LLC., Charlotte, N.C.), 18 mm diameter lithium (0.38 mm thick lithium ribbon; Aldrich Chemicals, Milwaukee, Wis.) and an 18 mm diameter copper spacer (600 μm thick). 100 μL of electrolyte solution (1M $LiPF_6$ in 90 wt % ethylene carbonate (EC):diethylene carbonate (DEC) (1:2 v/v) (Ferro Chemicals (Zachary, La.); 10 wt % fluoroethylene carbonate (FEC) (Fujian Chuangxin Science and Technology Development, LTP, Fujian, China) were mixed and used as the electrolyte. The electrolyte mixture was dried over molecular sieves (3A type) over 12 hrs. The coin cells were charged and discharged from 0.005V to 0.90V with a constant current of 250 mA/g for alloy and alloy/graphite electrodes and with a constant current of 100 mA/g for graphite electrodes. During charging, when the cell reached 0.90 V, the cell voltage was held constant and the charging continued until the current reached 10 mA/g. The cell was allowed to remain at open circuit for fifteen minutes at the end of every half cycle.

The initial charge capacity of each cell was calculated from the measured total milliamp-hours charged until the cell voltage reached 0.005 V. The cell was then discharged as described above. The irreversible capacity loss (shown in Table 2) was calculated from the difference between the ini-

TABLE 1

Calculated Wt % of total, dried coating

| | Example | | | | | | | | | |
|---|---|---|---|---|---|---|---|---|---|---|
| | 1 | 2 | 3 | 4 | 5 | 6 | 7 | 8 | 9 | 10 |
| $Si_{70}Fe_{10}Ti_{10}C_{10}$ | 60 | 92 | 60 | 92 | — | — | 92 | — | 5 | 47.5 |
| 65 wt % $Si_{70}Fe_{10}Ti_{10}C_{10}$:35 wt % SLP30 | — | — | — | — | — | 92 | — | — | — | — |
| MCMB 1028 | 32 | — | — | — | — | — | — | — | — | — |
| MCMB 6-28 | — | — | — | — | — | — | — | — | 90 | — |
| SFG44 | — | — | — | — | — | — | — | — | — | 47.5 |
| KETJEN Black | 1.2 | 1.2 | — | — | — | — | — | — | — | — |
| PAA100k-64% Li salt | 6.8 | 6.8 | — | — | — | — | — | — | — | — |
| SLP30 | — | — | 32 | — | 95 | — | — | 95 | — | — |
| PAA100k-107% Li salt | — | — | 8 | 8 | 5 | — | — | — | — | — |
| PAA250k-107% Li salt | — | — | — | — | — | 8 | 8 | 5 | — | — |
| KYNAR 741 | — | — | — | — | — | — | — | — | 5 | 5 |
| Die Gap for coating (μm) | 125 | 75 | 125 | 75 | 125 | 75 | 75 | 75 | 250 | 250 | tial charge capacity and the first discharge capacity divided by the initial capacity times 100. The data in Table 2 show that negative electrodes made using the binders of this invention have less irreversible capacity loss compared with electrodes made with polyvinylidene fluoride binders.

TABLE 2

Initial Charge Capacity and Irreversible Capacity of Examples 1-8

| | Initial Charge Capacity (mAh/g Active Material) | Irreversible Capacity Loss (%) |
|---|---|---|
| Example 1 | No Data | No Data |
| Example 2 | No Data | No Data |
| Example 3 | 982 | 10.0 |
| Example 4 | 1339 | 10.4 |
| Example 5 | 392 | 8.7 |
| Example 6 | 987 | 9.8 |
| Example 7 | 1339 | 9.6 |
| Example 8 | 397 | 8.3 |
| Comparative Example 1 | 388 | 15.7 |
| Comparative Example 2 | 819 | 19.3 |

The discharge capacity after cycle 5 and after cycle 50 for each cell is shown in Table 3. The data show that cells containing negative electrodes with binders of this invention have less fade after 50 cycles than those made with polyvinylene fluoride binders.

TABLE 3

Discharge Capacity at Cycle 5 and at Cycle 50 for Examples 1-8

| | Discharge Capacity at Cycle 5 (mAh/g Alloy and graphite) | Discharge Capacity at Cycle 50 (mAh/g Alloy and graphite) | % Capacity Loss/Cycle |
|---|---|---|---|
| Example 1 | 864 | 854 | 0.026 |
| Example 2 | 1219 | 1179 | 0.073 |
| Example 3 | 891 | 862 | 1.072 |
| Example 4 | 1190 | 1134 | 0.105 |
| Example 5 | 363 | 362 | 0.006 |
| Example 6 | 897 | 847 | 0.012 |
| Example 7 | 1219 | 1138 | 0.144 |
| Example 8 | 365 | 366 | — |
| Comparative Example 1 | 311 | 289* | 0.157 |
| Comparative Example 2 | 451 | 136 | 1.550 |

*Comparative Example 1 Discharge Capacity at Cycle 19

Examples 9 and 10

Composition A—92 wt % alloy/graphite and 8 wt % lithium polysulfonate fluoropolymer 1.214 g $Si_{66.4}Fe_{11.2}Ti_{11.2}C_{11.2}$ alloy powder (from Preparatory Example 2)
0.626 g graphite (TIMREX SLP30, Bodio, Switzerland)
1.82 g of an 8.8 wt % solution of lithium polysulfonate fluoropolymer (from preparation above)
1.20 g deionized water
Composition B—98 wt % alloy/graphite and 2 wt % lithium polysulfonate fluoropolymer
1.29 g $Si_{66.4}Fe_{11.2}Ti_{11.2}C_{11.2}$ alloy powder
0.66 g graphite (TIMREX SLP30)
0.20 g of a 20 wt % solution of lithium polysulfonate fluoropolymer (from preparation above)
1.20 g deionized water.

Each composition (A and B) was independently charged to a 45 mL stainless steel vessel with four 1.27 cm diameter tungsten carbide balls. The closed vessels were then placed into a planetary micro mill (PULVERSETTE 7 Model; Fritsch, Germany) and mixed for 30 min at a speed of 2. The viscous mixtures were coated onto a 13 μm thick copper foil using a notched coating bar with a 150 μm gap. The coatings were dried at room temperature for 30 min and then at 120° C. under vacuum for 2 hrs. The coatings were then pressed between two rollers to compress the electrodes.

Test Cell Preparation for Examples 9 and 10

Half coin cells were prepared using 2325 coin cells. All of the components were dried prior to assembling and the cell preparations were done in a dry room with a −70° C. dew point. The cells were constructed from the following components and in the following order from the bottom up. Cu foil/Li metal film/Separator/Electrolyte/Separator/Alloy Composition/Cu foil. The separator was CELGARD 2400 microporous separator (Celgard LLC, Charlotte, N.C.). The electrolyte was 1 M $LiPF_6$ in 90 wt % ethylene carbonate: diethylene carbonate 1:2 by volume with 10% fluoroethylene carbonate (available from Kanto Denka Kogyo Co., Ltd., Tokyo, Japan) added. The lithium metal was 18 mm in diameter (0.38 mm thick lithium ribbon; Aldrich Chemicals, Milwaukee, Wis.). 100 ml of the electrolyte solution was used to fill each cell. The cells were crimp sealed prior to testing.

The cell containing the negative electrode comprising Composition A was run as Example 9. The cell containing the negative electrode comprising Composition B was run as Example 10.

Testing of Examples 9 and 10

The cells were cycled from 0.005 V to 0.9 V at a rate of C/4 at room temperature using a Maccor cycler. For each cycle the cells were first discharged at a C/4 rate with a trickle current of 10 mA/g at the end of discharge and then a rest for 15 min at open circuit. The cells were then charged at C/4 rate followed by another by another 15 min rest at open circuit. The cells were run through many cycles to determine the extent of capacity fade as a function of the number of cycles completed. Cells that exhibit low capacity fade are considered to have superior cycle life. The results are displayed in Table 4.

TABLE 4

Discharge Capacity of Electrodes with Lithium Polysulfonate Fluoropolymer Binders

| Example | Composition | Irreversible Capacity Cycle 1 (%) | Discharge Capacity Cycle 1 (mAh/g) | Discharge Capacity Cycle 40 (mAh/g) | % Capacity Fade (cycle 2 to 40) |
|---|---|---|---|---|---|
| 9 | A | 27.4 | 821 | 647 | 0 |
| 10 | B | 16.9 | 770 | 597 | 9.7 |

Examples 11-13

Composition A—96 wt % alloy/graphite and 4 wt % sodium polysulfonate
1.27 g $Si_{66.4}Fe_{11.2}Ti_{11.2}C_{11.2}$ alloy powder
0.65 g graphite (TIMREX SLP30)
1.60 g of an 5 wt % solution of sodium polysulfonate (70,000 MW available from Polysciences)
1.20 g deionized water.
Composition B—96 wt % alloy/graphite and 4 wt % sodium polysulfonate
1.27 g. $Si_{66.4}Fe_{11.2}Ti_{11.2}C_{11.2}$ alloy powder
0.65 g graphite (TIMREX SLP30, TimCal Ltd., Bodio, Switzerland)

1.60 g of a 5 wt % solution of sodium polysulfonate (500,000 MW available from Polysciences)
1.20 g deionized water.
Composition C—96 wt % alloy/graphite and 4 wt % sodium polysulfonate
1.27 g $Si_{66.4}Fe_{11.2}Ti_{11.2}C_{11.2}$ alloy powder
0.65 g graphite (TIMREX SLP30, TimCal Ltd., CH-6743 Bodio, Switzerland)
1.91 g of 4.18 wt % solution of PSS Li ($M_w$ 500,000) in ionized water (Preparatory Example 2)
1.0. deionized water.

Preparation of Electrodes

Each composition (A, B, and C) were independently charged to a 45 ml. stainless steel vessel with four 1.27 cm diameter tungsten carbide balls. The closed vessels were then placed into a planetary micro mill (PULVERSETTE 7 Model; Fritsch, Germany) and mixed for 30 min at a speed of 2. The viscous mixtures were coated onto a 13 μm thick copper foil using a notched coating bar with a 150 μm gap. The coatings were dried at room temperature for 30 min and then at 120° C. under vacuum for 2 hrs. The coating was then pressed between two rollers to compress the electrode.

Test Cell Preparation for Examples 11-13

Half coin cells were prepared using 2325 coin cells. All of the components were dried prior to assembling and the cell preparations were done in a dry room with a −70° C. dew point. The cells were constructed from the following components and in the following order from the bottom up. Cu foil/Li metal film/Separator/Electrolyte/Separator/Alloy Composition/Cu foil. The separator was CELGARD 2400 microporous separator. The electrolyte was 1 M $LiPF_6$ in 90 wt % ethylene carbonate:diethylene carbonate 1:2 by volume with 10 wt % fluoroethylene carbonate (available from Kanto Denka Kogyo Co., Ltd., Tokyo, Japan) added. The lithium metal was 18 mm in diameter (0.38 mm thick lithium ribbon; Aldrich Chemicals). 100 mL of the electrolyte solution was used to fill each cell. The cells were crimp sealed prior to testing.

The cell containing the negative electrode comprising Composition A was run as Example 11. The cell containing the negative electrode comprising Composition B was run as Example 12. The cell containing the negative electrode comprising Composition C was run as Example 13.

Testing of Examples 11-13

The cells were cycled from 0.005 V to 0.9 V at a rate of C/4 at room temperature using a Maccor cycler. For each cycle the cells were first discharged at a C/4 rate with a trickle current of 10 mA/g at the end of discharge and then a rest for 15 min at open circuit. The cells were then charged at C/4 rate followed by another by another 15 min rest at open circuit. The cells were run through many cycles to determine the extent of capacity fade as a function of the number of cycles completed. Cells that exhibit low capacity fade are considered to have superior cycle life. The results are displayed in Table 5.

TABLE 5

Discharge Capacity of Electrodes with Sodium Polysulfonate Binders

| Example | Composition | Irreversible Capacity Cycle 1 (%) | Discharge Capacity Cycle 1 (mAh/g) | Discharge Capacity Cycle 18 (mAh/g) | % Capacity Fade (cycle 2 to 18) |
|---|---|---|---|---|---|
| 11 | A | 14.8 | 768 | 624 | 6.8 |
| 12 | B | 14.6 | 763 | 665 | 1.6 |
| 13 | C | 14.7 | 775 | 662 | 3.2 |

Electrode Fabrication

Examples 14-23

Example 14

1.267 g $Si_{66.4}Fe_{11.2}Ti_{11.2}C_{11.2}$ alloy powder (from Preparatory Example 2) 0.6582 g SLP30 graphite, 1.60 g poly (ethylene-alt-maleic acid) Li salt (5% solids in water from Preparatory Example 6) and 1.50 g deionized water were mixed in a 45 mL stainless steel vessel using four ½ inch (1.27 cm) diameter tungsten carbide balls. The mixing was done in a planetary micromill (PULVERISETTE Model 7) at a speed of 2 for 30 min. The resulting solution was hand spread onto a 10 μm thick copper foil using a gap die of 0.006 in (0.15 mm). The sample was air dried for 15 min, then calendered and dried in a vacuum oven at 80° C. for 1 hr.

Example 15

1.90 g SLP30 graphite, 2.0 g poly(ethylene-alt-maleic acid) Li salt (5 wt % solids in water from Preparatory Example 6) and 2.0 g deionized water were mixed in a 45 mL stainless steel vessel using four ½ inch (1.27 cm) diameter tungsten carbide balls. The mixing was done in a planetary micromill (PULVERISETTE Model 7) at a speed of 2 for 30 min. The resulting solution was hand spread onto a 10 μm thick copper foil using a gap die of 0.006 in (0.15 cm). The sample was air dried for 15 min, then calendered and dried in a vacuum oven at 80° C. for 1 hr.

Example 16

An electrode was fabricated using a procedure identical to that used in Example 15 except that 0.80 g 10 wt % poly (acrylic acid-co-maleic acid) Li salt solution in water was made from the solid poly(acrylic acid-co-maleic acid) made according to the procedure in Preparatory Example 7.

Example 17

An electrode was fabricated using the procedure in Example 16 except that 1.0 g 10 wt % poly(acrylic acid-co-maleic acid) Li salt solution was used along with 3.0 g deionized water.

Example 18

An electrode was fabricated using the procedure in Example 14 using 16.0 g 10 wt % poly(methyl vinyl ether-alt-maleic acid) Li salt solution in water and 0.20 g deionized water and a 0.005 in gap (0.125 mm) for coating. The final drying was in an oven at 120° C. under vacuum for 1 hr.

Example 19

An electrode was fabricated using the procedure in Example 15 using 2.0 g 5 wt % poly(methyl vinyl ether-alt-maleic acid) Li salt solution in water (from Preparatory Example 8) and 1.0 g deionized water with a 0.005 in (0.125 cm) gap for coating. The final drying was in an oven at 120° C. under vacuum for 1 hr.

Example 20

An electrode was fabricated using the procedure in Example 15 using 2.0 g 5 wt % poly(2-acrylamido-2-methyl-1-propanesulfonic acid) Li salt (from Preparatory Example 9) and 2.0 g deionized water.

Example 21

An electrode was fabricated using the procedure in Example 14 using 2.88 g 2.5 wt % poly(acrylic acid) Li salt ($M_w$ 450000) solution in water and 0.16 g of a 5 wt % poly(2-acrylamido-2-methyl-1-propanesulfonic acid) Li salt (from Preparatory Example 9) with 0.40 g deionized water.

Example 22

An electrode was fabricated using the procedure in Example 15 using 3.60 g 2.5 wt % poly(acrylic acid) Li salt ($M_w$ 450000) solution in water and 0.20 g of a 5 wt % poly(2-acrylamido-2-methyl-1-propanesulfonic acid) Li salt (from Preparatory Example 9) with 1.00 g deionized water.

Example 23

An electrode was fabricated using the procedure in Example 15 using $Si_{66.4}Fe_{11.2}Ti_{11.2}C_{11.2}$ alloy powder instead of SLP30, 1.44 g 10 wt % poly(acrylic acid) Li salt ($M_w$ 250000) solution in water and 0.32 g 5 wt % poly(2-acrylamido-2-methyl-1-propanesulfonic acid) Li salt (see Preparatory Example 9) with 0.40 g deionized water.

Test Cell Preparation of Examples 14-23

Test cells were made using a procedure identical to that used for Test Cell Preparation of Examples 1-8 except that the alloy electrodes were cycled at a specific rate of 200 mA/g with a trickle down to 10 mA/g at the end of discharge (delithiation) and 15 min of rest at open circuit at the end of every half cycle. The test cells with graphite only (SLP30) were cycled at a 100 mA/g rate with a trickle down to 10 mA/g.

Testing of Examples 14-23

Performance of the test cells prepared using the electrodes of Examples 14-23 are shown in Table 6. The data shows that poly(ethylene-alt-maleic acid) Li salt, poly(acrylic acid-co-maleic acid) Li salt and poly(methyl vinyl ether-alt-maleic acid) Li salt were excellent binders for $Si_{66.4}Fe_{11.2}Ti_{11.2}C_{11.2}$ alloy/SLP30 graphite composite electrodes and SLP30 graphite electrodes. Poly(2-acrylamide-2-methyl-1-propanesulfonic acid) Li salt was an excellent thickener for poly(acrylic acid) Li salt binder coating dispersions and resulted in good cycling performance of the resulting electrodes. These two polymers were completely miscible in water.

TABLE 6

Performance Data for Examples 14-23

| Example | Initial Capacity Loss (%) | Capacity after 2 cycles (mAh/g) | Capacity after 50 Cycles (mAh/g) |
|---|---|---|---|
| 14 | 13.46 | 710 | 700 |
| 15 | 7.89 | 361 | 361 |
| 16 | 17.48 | 705 | 689 |
| 17 | 14.83 | 359 | 358 |
| 18 | 19.10 | 690 | 669 |
| 19 | 13.64 | 361 | 363 |
| 20 | 9.18 | 360 | 358 |
| 21 | 14.01 | 670 | 667 |
| 22 | 8.42 | 361 | 361 |
| 23 | 13.02 | 869 | 869 |

Electrode Fabrication

Examples 24-25 and Comparative Example 3

Example 24

3.60 g $LiFePO_4$ (Phostech Lithium Inc., Quebec, Canada), 0.20 g SP (conductive carbon SP; Osaka Gas Chemicals Co., Ltd; Osaka-Shi, Japan), 8.0 g 2.5 wt % poly(acrylic acid) Li Salt solution (see Preparatory Example 1 using poly(acrylic acid) with a Mw of 450000 and diluted to 2.5 wt % in water) and 3.0 g deionized water were mixed in a 45-mL stainless steel vessel using four 0.5 in (0.127 cm) diameter tungsten carbide balls. The mixing was done in a planetary micro mill (PULVERISETTE 7 Model) at speed 2 for 30 min. The resulting solution was hand spread onto a 13 μm thick Al foil using a gap die of 0.010 in (0.25 cm) gap. The sample was air dried for 15 min and dried in a vacuum oven at 120° C. for 1 hr.

Comparative Example 3

3.60 g $LiFePO_4$ (Phostech), 0.20 g SP (conductive carbon SP; Osaka Gas Chemicals Co., Ltd., Osaka-Shi, Japan), 2.0 g 10 wt % polyvinylidene (Kynar 471, Ausimont USA Inc., Thorofare, N.J.) solution in NMP (1-methyl-2-pyrrolidinone, ACS Grade; Alfa Aesar,) and 5.0 g NMP were mixed in a 45 mL stainless steel vessel using four 0.5 in (0.127 cm) diameter tungsten carbide balls. The mixing was done in a planetary micro mill (PULVERISETTE 7 Model) at speed 2 for 30 min. The resulting solution was hand spread onto a 13-micron thick Al foil using a gap die of 0.010 in (0.25 cm) gap. The sample was air dried at 80° C. for 15 min and dried in a vacuum oven set at 120° C. for 1 hr.

Example 25

1.80 g $LiMn_2O_4$ (available from Honjo Chemical, Japan), 0.10 g SP (conductive carbon SP; Osaka Gas Chemicals Co), 4.0 g of a 2.5 wt % poly(acrylic acid) Li Salt solution in $H_2O$ were mixed in a 45-mL stainless steel vessel using four 0.5 in (0.127 cm) diameter tungsten carbide balls. The mixing was done in a planetary micro mill (PULVERISETTE 7 Model) at speed 2 for 30 min. The resulting solution was hand spread onto a 13 μm thick Al foil using a gap die of 0.010 in (0.25 cm) gap. The sample was air dried at 80° C. for 15 min and dried in a vacuum oven at 120° C. for 1 hr.

Test Cell Fabrication for Examples 24-25 and Comparative Example 3

Disks of 16-mm diameter were punched off as electrodes in 2325-button cells. Each 2325 cell consists of a 18-mm diameter Al spacer 0.031 in (0.78 mm) thick, a 16 mm diameter electrode, one 20 mm diameter micro porous separator (CELGARD 2400), an 18 mm diameter Li (0.38 mm thick lithium ribbon; available from Aldrich, Milwaukee, Wis.) and an 18 mm diameter copper spacer with a thickness of 0.030 in (0.75 mm). 100 μL of electrolyte (1M $LiPF_6$ in 90 wt % (1 EC: 2DEC v/v) and 10 wt % FEC was used. The solvent was made from 1EC: 2DEC mixture (by volume) from Ferro Chemicals (Ferro Corp., Zachary, La.) and FEC (Fluoroethylene carbonate) (Fujian Chuangxin Science and Technology Develops, Fujian, China). The mixture was dried over molecular sieve (3A type) over 12 hrs).

Test cells with $LiFeO_4$ electrodes were cycled from 2.70 V to 3.80 V at a specific rate of 40 mA/g with trickle down to 4 mA/g at the end of charge. Test cells with $LiMn_2O_4$ electrodes were cycled from 3.0 V to 4.30 V and to 4.40 V at specific rate of 40 mA/g with trickle down to 4 mA/g at the end of charge.

Performance of these electrodes are shown in Table 7. Test cells with LiFePO$_4$ electrodes using a poly(acrylic acid) Li salt binder (Example 24) showed a cycling performance similar to LiFePO$_4$ electrodes made with poly(vinylidene fluoride) (Kynar 471) binder chemistry. Cell impedance, however, was lower with poly(acrylic acid) Li salt binder chemistry. Test cells with LiMn$_2$O$_4$ electrodes with poly(acrylic acid) Li salt binders showed good capacity retention in cycling. For these electrodes capacity fade was observed in the early stages of cycling (up to 25 cycles) but the capacity stabilized after that to 200 cycles. Excellent capacity retention of 94% after 200 cycles in test cells with metallic Li counter was observed.

TABLE 7

Performance of Examples 24-25 and Comparative Example 3

| Example | Voltage Window (vs. Li) | Capacity after 2 cycles (mAh/g) | Capacity (mAh/g) |
|---|---|---|---|
| 24 | 2.7-3.8 V | 135 | 136 (145 cycles) |
| Comparative Example 3 | 2.7-3.8 V | 135 | 135 (145 cycles) |
| 25 | 3.0-4.3 V | 102 | 97 (200 cycles) |

Electrode Fabrication

Examples 26-27 and Comparative Examples 4-9

80 wt % active material (AM), 12 wt % carbon black and 8 wt % binder. Two types of active material were tested: (1) Fe$_2$O$_3$ (<5 μm, Aldrich) and (2) "Fe$_2$O$_3$ ball-milled". The ball-milling process was: 4 g of Fe$_2$O$_3$ powder was milled for 2 hrs under argon protection using a Spex 8000 high energy ball milling machine with 12 mm diameter hardened stainless steel balls as the mixing media. The carbon black used here was super S carbon black (SS) (MMM Carbon, Belgium). Four binders were used: (1) poly(vinylidene fluoride) (PVDF), (2) poly(acrylic acid) Li salt (100% neutralized), (3) polyimide (PI) and (4) sodium carboxymethyl cellulose (CMC). The electrodes were tested as shown in Table 8.

TABLE 8

Compositions of Electrodes of Examples 26-27 and Comparative Examples 4-9

| Example | Active material (AM) | Carbon black | Binder |
|---|---|---|---|
| 26 | Fe$_2$O$_3$ | SS | PAA(-100% Li salt) |
| 27 | Fe$_2$O$_3$ ball-milled | SS | PAA(-100% Li salt) |
| Comparative 4 | Fe$_2$O$_3$ | SS | PVDF |
| Comparative 5 | Fe$_2$O$_3$ | SS | PI |
| Comparative 6 | Fe$_2$O$_3$ | SS | CMC |
| Comparative 7 | Fe$_2$O$_3$ ball-milled | SS | PVDF |
| Comparative 8 | Fe$_2$O$_3$ ball-milled | SS | PI |
| Comparative 9 | Fe$_2$O$_3$ ball-milled | SS | CMC |

Electrode Preparation

Examples 26-27 and Comparative Examples 4-9

Example 26

0.592 g AM, 0.089 g SS, 0.538 g PAA (~100% Li salt) solution (11 wt % solution in water, made by the method mentioned above) and 0.732 g water were added into an egg-shaped hardened steel vial. The mixture was shaken for one half hr at 500 shakes per minute using a low energy ball mill (modified Spex 8000 mill). The formed slurry was then cast on a copper foil with a 75 μm high notch bar and dried at 90° C. in air overnight. Typical active material loading was 2.58 mg/cm$^2$.

Example 27

0.503 g AM, 0.075 g SS, 0.457 g PAA (100% Li salt) solution (11 wt % solution in water, made by the method mentioned above) and 1.313 g water were added into an egg-shaped hardened steel vial. The mixture was shaken to form a slurry and then coated and dried as described in Example 26. Typical active material loading was 1.32 mg/cm$^2$.

Comparative Example 4

0.590 g AM, 0.088 g SS, 0.655 g PVDF solution (9 wt % solution in N-methyl pyrrolidinone (NMP), NRC Canada) and 1.545 g NMP were added into an egg-shaped hardened steel vial. The mixture was shaken to form a slurry and then coated and dried as described in Example 26. Typical active material loading was 1.19 mg/cm$^2$.

Comparative Example 5

0.518 g AM, 0.077 g SS, 0.263 g PI solution (HD Micro PI2525, 19.6 solid wt % solution in NMP) and 1.400 g NMP were added into an egg-shaped hardened steel vial. The mixture was shaken to form a slurry and then coated and dried as described in Example 26. Typical active material loading was 1.38 mg/cm$^2$.

Comparative Example 6

0.500 g AM, 0.075 g SS, 0.050 g CMC powder (Daicel CMC2200) and 2.485 g water were added into an egg-shaped hardened steel vial. The mixture was shaken to form a slurry and then coated and dried as described in Example 26. Typical active material loading was 1.00 mg/cm$^2$.

Comparative Example 7

0.515 g AM, 0.077 g SS, 0.572 g PVDF solution (9 wt % solution in N-methyl pyrrolidinone (NMP), NRC Canada) and 1.562 g NMP were added into an egg-shaped hardened steel vial. The mixture was shaken to form a slurry and then coated and dried as described in Example 26. Typical active material loading was 1.07 mg/cm$^2$.

Comparative Example 8

0.608 g AM, 0.091 g SS, 0.310 g PI solution (HD micro PI2525, 19.6 solid wt % solution in NMP) and 1.545 g NMP were added into an egg-shaped hardened steel vial. The mixture was shaken to form a slurry and then coated and dried as described in Example 26. Typical active material loading was 1.45 mg/cm$^2$.

Comparative Example 9

0.500 g AM, 0.075 g SS, 0.050 g CMC powder (Daicel CMC2200) and 2.565 g water were added into an egg-shaped hardened steel vial. The mixture was shaken to form a slurry and then coated and dried as described in Example 26. Typical active material loading was 0.94 mg/cm$^2$.

Test Cell Preparation for Examples 26-27 and Comparative Examples 4-9

The Fe$_2$O$_3$ electrodes served as a working electrode in a 2325-type coin cell using a lithium foil (FMC) disk as a counter and reference electrode. Two layers of microporous polypropylene (PP) separator (CELGARD 2500) were used for each coin cell. The electrolyte used was 1 M LiPF$_6$ (Stella, Japan) in a mixed solution of 90 wt % ethylene carbonate (EC):diethyl carbonate (DEC) (volume ratio 1:2, Grant Chemical Ferro Division) and 10 wt % fluoroethylene carbonate (FEC, Fujian Chuangxin, China). The coin cells were assembled and crimped closed in an argon-filled glove box. The cells were cycled at C/20 for the first two cycles, followed by cycling at C/5 for the rest of the cycles. C-rate was calculated based on a specific capacity of 1007 mAh/g.

Figure 2:
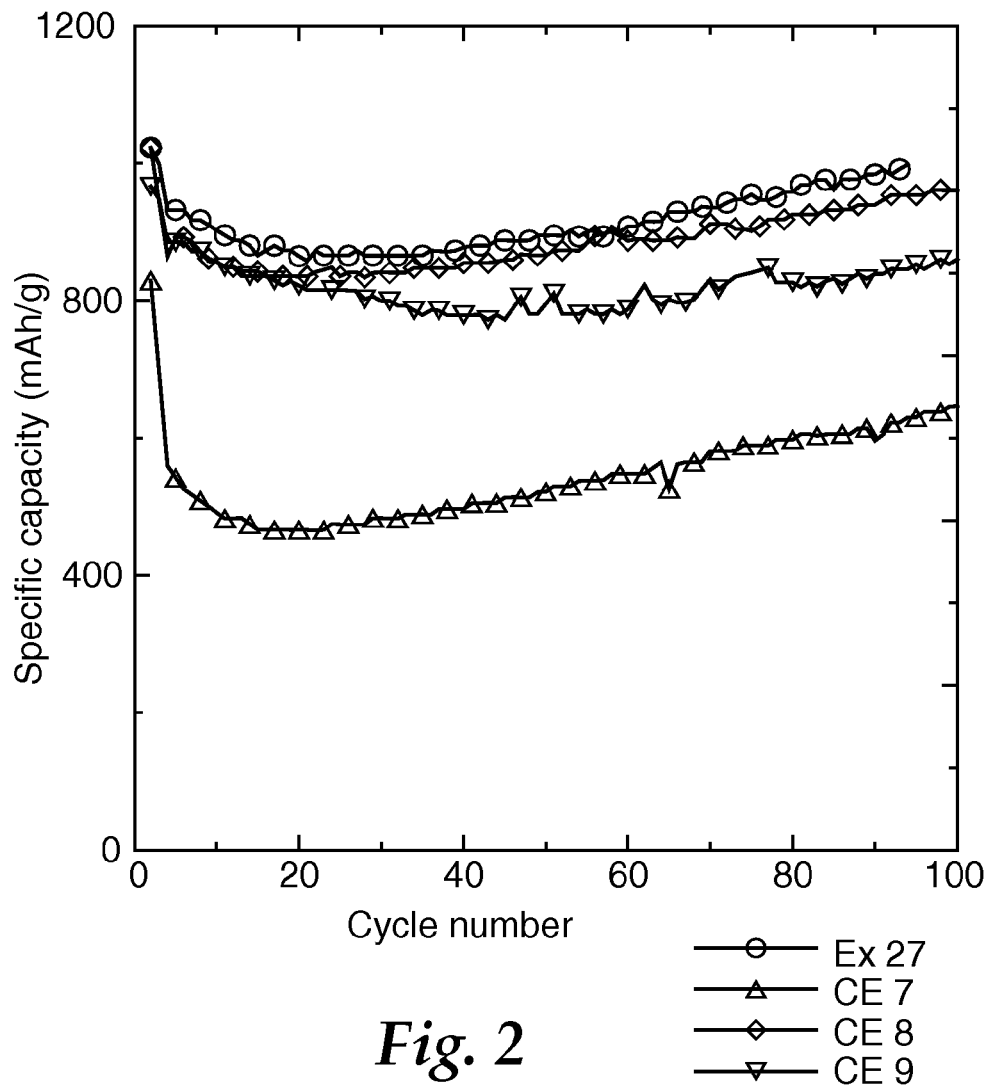
FIG. 2 is a graph of the cycling performance (mAh/g vs. cycle number) of another one of the embodiments of the provided electrodes when incorporated into a 2325 coin cell.

Cycling results (mAh/g vs. cycle number) are shown in FIG. 1 for Fe$_2$O$_3$ electrodes that were made according to the procedure in Example 26 and Comparative Examples 4-6. FIG. 2 shows cycling data for Example 27 and Comparative Examples 7-9.

Example 28 and Comparative Examples 10 and 11

Figure 3:
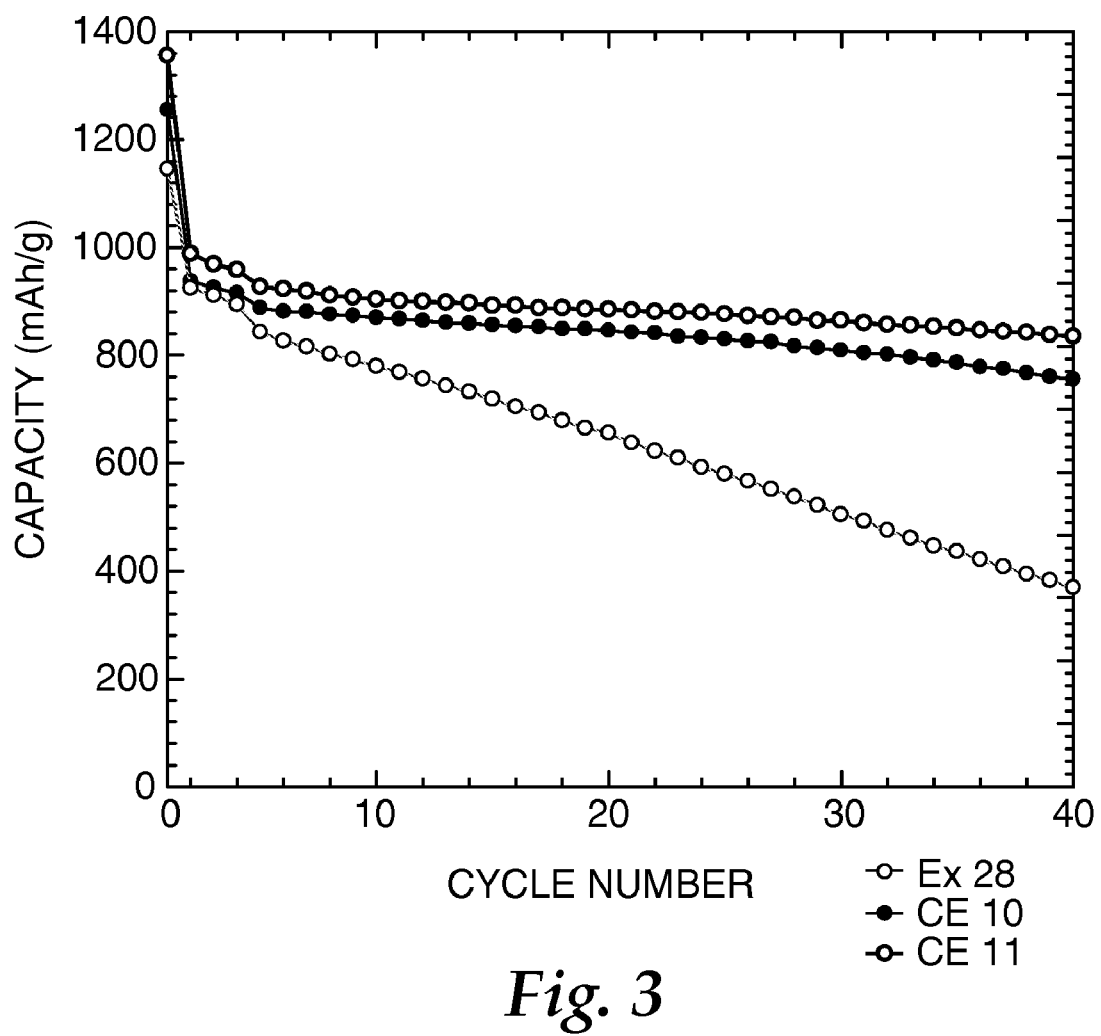
FIG. 3 is a graph of the cycling performance (mAh/g vs. cycle number) of one of the embodiments of the provided electrodes that has a polyacrylonitrile (PAN) binder.

1.6 g of Si$_{60}$Al$_{14}$Fe$_8$TiIn$_3$Sn$_4$Mm$_{10}$ meltspun ribbon (made according to the procedure disclosed in Example 2 of U.S. Pat. Publ. No. 2007/0020522 (Obrovac et al. and heat-treated at 200° C. in argon for 1 hour), 0.24 g of Super-P carbon black, 1.6 g of a solution of 10 wt % PAN (Aldrich) in NMP (Aldrich), and 3.4 g of NMP were mixed together with three ⅜" (9.5 mm) tungsten carbide balls in a 40 mL tungsten carbide milling container using a Fritsch Pulverisette planetary mill set at speed 3 for one hr. The resulting slurry was spread onto a nickel foil using a doctor blade with a 0.0075 in (190 μm) gap. The electrode was then placed in an 80° C. oven for 30 min to remove the majority of the NMP, then cured in a 260° C. oven in air overnight. Coin cells were constructed with the cured electrode with a lithium counter/reference electrode and 1M LiPF$_6$ in EC/DEC (1:2 by volume) electrolyte. Plots of the capacity and coulombic efficiency of the electrode are shown in FIG. 3. Also shown in the figure are results from a Si$_{60}$Al$_{14}$Fe$_8$TiIn$_3$Sn$_4$Mm$_{10}$ electrode with a PAN binder cured in helium instead of air (Comparative Example 11) and a Si$_{60}$Al$_{14}$Fe$_8$TiIn$_3$Sn$_4$Mm$_{10}$ electrode with a 20 wt % (in NMP) PI binder (PYRALIN PI2555, available from HD Microsystems, Parlin, N.J.) (Comparative Example 12).

Example 29

Figure 4:
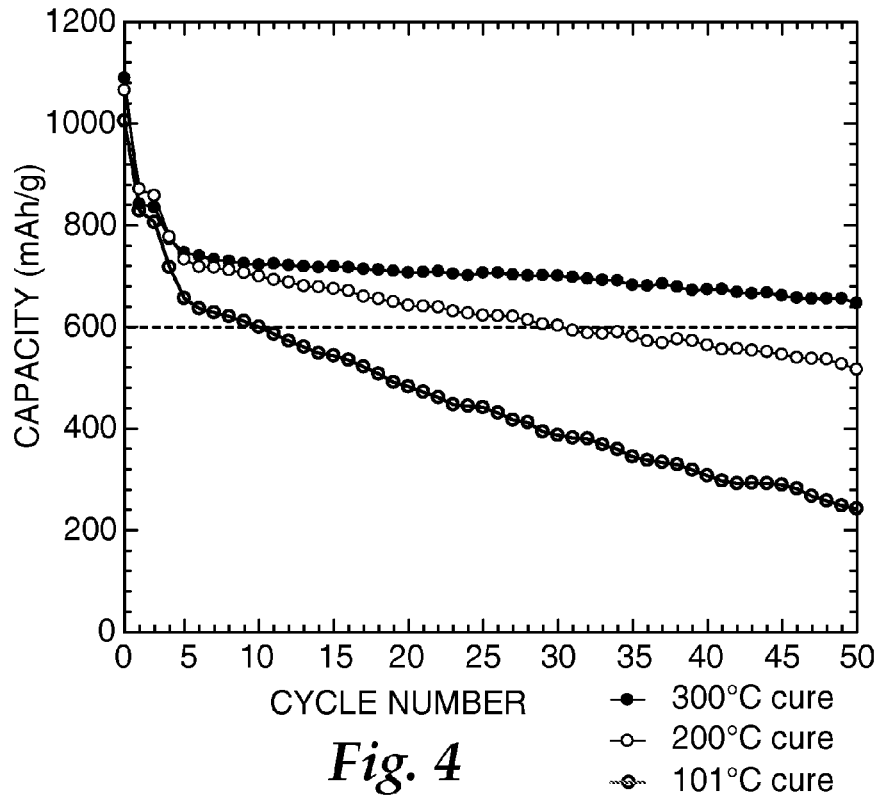
FIG. 4 is a graph of the cycling performance (mAh/g vs. cycle number) of one of the embodiments of the provided electrodes that has a phenolic resin binder.

1.6 g of an Si$_{60}$Al$_{14}$Fe$_8$Ti$_1$Sn$_7$(Mm)$_{10}$ alloy (made using the procedure in Example 1 of U.S. Pat. Publ. No. 2007/0020521 (Obrovac et al.), 0.24 g of Super P carbon black and 0.2133 g of a phenolic resin (referred to as "RPR1" in column 11 of U.S. Pat. No. 7,150,770 (Keipert et al.) and diluted to 75 wt % solids in water) were combined with 4 g of NMP and mixed in a Kurabo Mazerustar KK-50S with the following settings: step a: 6-6-8; step b: 8-5-10; and step c: 9-1-6. The slurry was coated onto a nickel foil with a doctor blade with a 0.0075 in (190 μm) gap and dried in an oven at 91° C. for one hour. The resulting coating was then sectioned into three pieces; the first piece was cured at 101° C. for 16 hrs in air, the second piece was cured at 200° C. for two hrs in air, the third piece was cured at 200° C. for two hrs in air followed by curing at 300° C. for 24 hrs in argon. Electrochemical half-cells (using lithium as the counter electrode) were constructed in coin cells with 1M LiPF$_6$ in EC/DEC 1:2 electrolyte. The cells were cycled between the voltage limits of 5 mV and 900 mV at a constant current of 100 mA/g for the first three cycles, then 200 mA/g for subsequent cycles. FIG. 4 shows the cycling performance of the cells. The cell containing the negative electrode cured at 300° C. in argon shows surprisingly improved performance compared to the cells cured at lower temperatures.

Example 30

Figure 5:
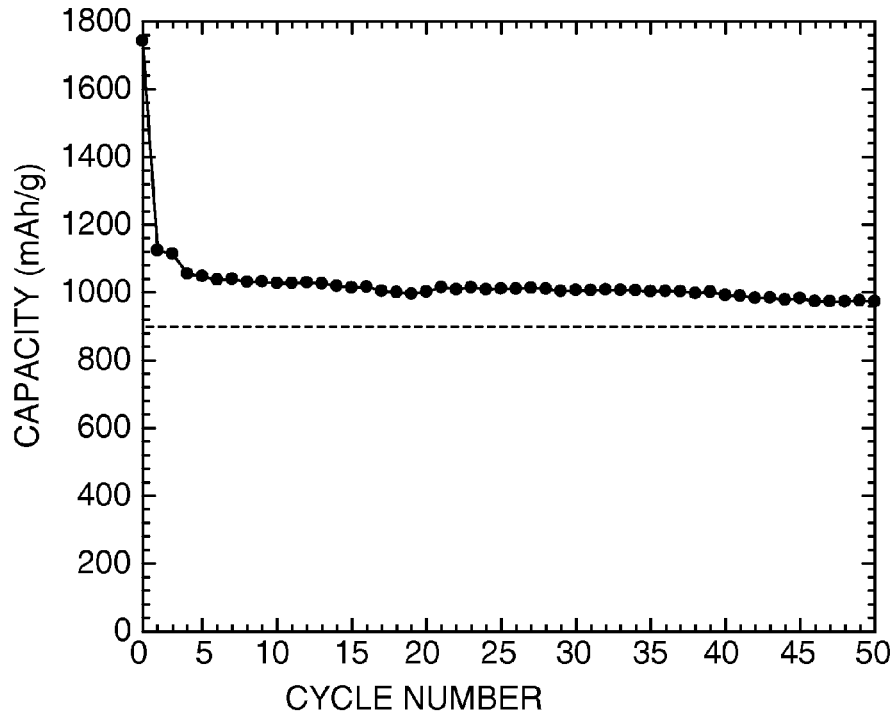
FIG. 5 is a graph of the cycling performance (mAh/g vs. cycle number) of one of the embodiments of the provided electrodes that has a glucose binder.

1.0562 g of glucose (Aldrich, anhydrous) was placed in an aluminum weighing dish and heated to 200° C. in air for two hours and then to 300° C. in argon for 24 hrs. After heating it was found that only 0.296 g of solids remained in the weighing pan. From this it was determined that glucose retains 29.6% of its weight after heating under these conditions. A slurry was prepared by combining 2 g of Si$_{60}$Al$_{14}$Fe$_8$Ti$_1$Sn$_7$(Mm)$_{10}$ alloy (from Example 29), 0.3 g of SUPER P carbon black and 0.67 g of glucose with 4 g of a 50/50 solution of water and ethanol. The slurry was mixed in a Kurabo Mazerustar mixer and spread onto a nickel foil as described in Example 29. The electrode was then dried at 80° C. for one hr in air, followed by heating at 200° C. in air for two hrs, and finally heating at 300° C. in argon for 24 hrs. From the weight loss experiment described above it was calculated that the electrode had a composition of 80 wt % Si$_{60}$Al$_{14}$Fe$_8$Ti$_1$Sn$_7$(Mm)$_{10}$ alloy, 12 wt % SUPER P, 8 wt % glucose solids by weight after heating. Electrochemical cells were constructed and tested as described in Example 29. The cycling performance is shown in FIG. 5. The cell shows excellent cycling with very little capacity loss after 50 cycles.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All of the cited references are herein incorporated by reference in their entirety.

We claim:

1. An electrode composition for a negative electrode comprising:
   a powdered material capable of undergoing lithiation and delithiation, wherein the powdered material is selected from tin, a tin alloy, silicon, a silicon alloy, and a combination thereof; and
   a nonelastic binder comprising a lithium polyacrylate, wherein the lithium polyacrylate is derived from homopolymers or copolymers of acrylic or methacrylic acid.

2. An electrode composition for a negative electrode of claim 1
   wherein more than 100% to about 107% of the acrylic or methacrylic acid groups have been neutralized.

3. The electrode composition according to claim 2, wherein the powdered material further comprises a material selected from silver, bismuth, carbon, lead, antimony, germanium, zinc, gold, platinum, palladium, arsenic, aluminum, gallium, indium, thallium, molybdenum, niobium, tungsten, tantalum, vanadium, chromium, zirconium, yttrium, a lanthanide, an actinide, and combinations thereof.

4. An electrode composition for a negative electrode comprising
   a powdered material capable of undergoing lithiation and delithiation, wherein the powdered material is selected from tin, a tin alloy, silicon, a silicon alloy, and a combination thereof; and a binder selected from a lithium polystyrenesulfonate, a lithium polysulfonate fluoropolymer, a lithium salt of a copolymer that includes maleic acid or a sulfonic acid, a cured phenolic resin, cured glucose, and combinations thereof.

5. The composition according to claim 4 wherein the lithium polysulfonate is selected from a polystyrenesulfonate and a polysulfonate fluoropolymer.

6. The composition according to claim 5 wherein the lithium polysulfonate fluoropolymer is derived from a polysulfonic acid fluoropolymer that comprises a substantially fluorinated backbone and pendant groups, wherein the pendent groups comprise:

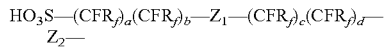

wherein each of a, b, c, and d independently range from 0-3, $c+d \geq 1$, $Z_1$ and $Z_2 = O$ or a single bond, and each $R_f$ is independently either F or a substantially fluorinated, branched or unbranched fluoroalkyl, fluoroalkoxyl, or fluoroether group that contains 1 to 15 carbon atoms and 0 to 4 oxygen atoms in the fluoroalkyl, fluoroalkoxyl, or fluoroether chain.

7. The composition according to claim 4 wherein the binder is selected from a poly(ethylene-alt-maleic acid) Li salt, poly(acrylic acid-co-maleic acid) Li salt, poly(methyl vinyl ether-alt-maleic acid) Li salt.

8. The composition according to claim 4, wherein the powdered material further comprises a material selected from silver, tin, bismuth, carbon, lead, antimony, germanium, zinc, gold, platinum, palladium, arsenic, aluminum, gallium, indium, thallium, molybdenum, niobium, tungsten, tantalum, iron, copper, titanium, vanadium, chromium, nickel, cobalt, zirconium, yttrium, a lanthanide, an actinide, and combinations thereof.

9. The composition according to claim 1 or 4, wherein the powdered material comprises from about 65 to about 85 mole % silicon, from about 5 to about 12 mole % iron, from about 5 to about 12 mole % titanium, and from about 5 to about 12 mole % carbon.

10. An electrochemical cell comprising:
at least one electrode that comprises a composition according to claim 1.

11. A battery pack comprising at least one cell according to claim 10.

12. A method of making a negative electrode comprising:
providing a current collector;
providing a powdered material capable of undergoing lithiation and delithiation, wherein the powdered material is selected from tin; a tin alloy; silicon; silicon alloy; and a combination thereof; and
applying to the current collector a coating that comprises the powdered material and a nonelastic binder comprising a lithium polyacrylate,
wherein the lithium polyacrylate is derived from homopolymers or copolymers of acrylic or methacrylic acid, and
wherein more than 100% to about 107% of the acrylic or methacrylic acid groups have been neutralized.

13. The method according to claim 12 wherein applying to the current collector a coating further comprises:
mixing the powdered material with a solution of the binder to form a dispersion;
milling the dispersion to form a coatable mixture;
coating the mixture onto the current collector; and
drying the coated current collector.

* * * * *